US006727926B1

(12) United States Patent
Utsuki et al.

(10) Patent No.: US 6,727,926 B1
(45) Date of Patent: Apr. 27, 2004

(54) DISPLAYING METHOD IN INFORMATION PROCESSING APPARATUS THAT PERMITS EXECUTION OF EITHER OBJECT OR TASK ORIENTED PROCESSINGS

(75) Inventors: Shingo Utsuki, Kokubunji (JP); Takashi Yoshimaru, Kokubunji (JP); Shuji Fujino, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/340,033

(22) Filed: Jun. 28, 1999

(30) Foreign Application Priority Data

Jun. 29, 1998 (JP) .......................................... 10-182366

(51) Int. Cl.[7] ................................................ G06F 3/00

(52) U.S. Cl. ....................... 345/853; 345/810; 345/835; 345/854

(58) Field of Search ................................. 345/764, 777, 345/810, 835, 837, 841, 846, 853, 854

(56) References Cited

U.S. PATENT DOCUMENTS 5,850,221 A * 12/1998 Macrae et al. ............. 345/853
5,999,179 A * 12/1999 Kekic et al. ................ 345/734
6,043,816 A * 3/2000 Williams et al. ............ 345/783
6,046,742 A * 4/2000 Chari ......................... 345/734
6,268,852 B1 * 7/2001 Lindhorst et al. ........... 345/744
6,317,142 B1 * 11/2001 Decoste et al. ............. 345/762

* cited by examiner

*Primary Examiner*—John Cabeca
*Assistant Examiner*—X. L. Bautista
(74) *Attorney, Agent, or Firm*—Antonelli, Terry, Stout & Kraus, LLP

(57) ABSTRACT

A displaying method that makes the following possible: Executing an operation from either of two approaches, i.e. a processing oriented to an object to be processed or a processing oriented to a task to be processed, and effectively dealing with a lot of tasks and various types of objects, and performing a flexible operation. In the displaying method in an information processing apparatus, both displays, i.e. a display intended for selecting the task to be processed and a display intended for selecting the object to be processed, are displayed on a display apparatus in such a manner that the two displays are distributed into two tabs, respectively. This condition makes it possible to select the task to be processed with a selection of the tabs, and also makes it possible to execute in an arbitrary order the processing oriented to the task and the processing oriented to the object.

2 Claims, 41 Drawing Sheets

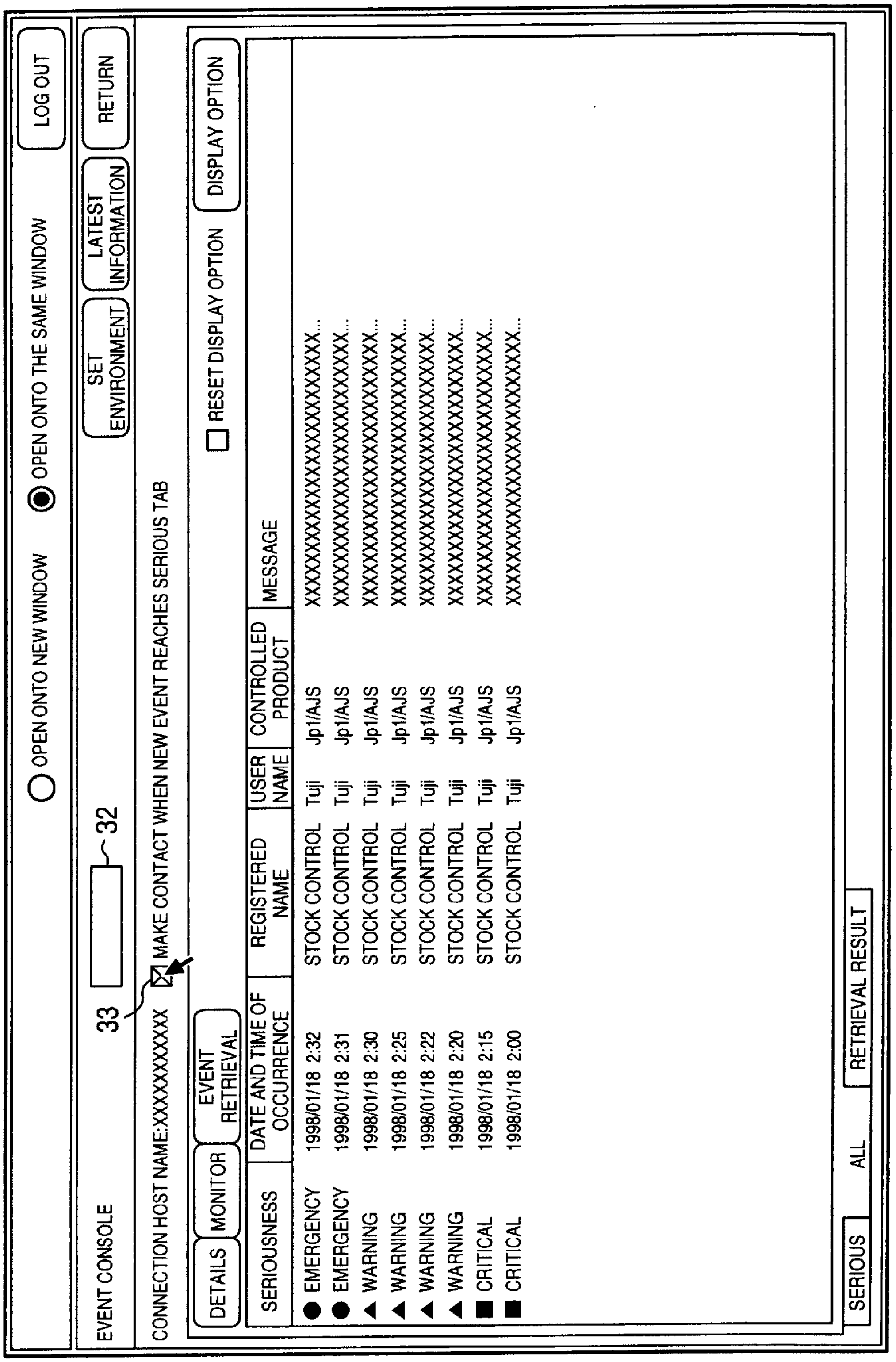

FIG. 30

| EVENT CONSOLE | | | ○ OPEN ONTO NEW WINDOW | ● OPEN ONTO THE SAME WINDOW | | LOG OUT |
|---|---|---|---|---|---|---|
| CONNECTION HOST NAME:XXXXXXXXXX | | 33 —32 | ☒ MAKE CONTACT WHEN NEW EVENT REACHES SERIOUS TAB | | SET ENVIRONMENT | LATEST INFORMATION | RETURN |

DETAILS | MONITOR | EVENT RETRIEVAL

☐ RESET DISPLAY OPTION | DISPLAY OPTION

| SERIOUSNESS | DATE AND TIME OF OCCURRENCE | REGISTERED NAME | USER NAME | CONTROLLED PRODUCT | MESSAGE |
|---|---|---|---|---|---|
| ● EMERGENCY | 1998/01/18 2:32 | STOCK CONTROL | Tuji | Jp1/AJS | XXXXXXXXXXXXXXXXXXXXXXXXXX... |
| ● EMERGENCY | 1998/01/18 2:31 | STOCK CONTROL | Tuji | Jp1/AJS | XXXXXXXXXXXXXXXXXXXXXXXXXX... |
| ▲ WARNING | 1998/01/18 2:30 | STOCK CONTROL | Tuji | Jp1/AJS | XXXXXXXXXXXXXXXXXXXXXXXXXX... |
| ▲ WARNING | 1998/01/18 2:25 | STOCK CONTROL | Tuji | Jp1/AJS | XXXXXXXXXXXXXXXXXXXXXXXXXX... |
| ▲ WARNING | 1998/01/18 2:22 | STOCK CONTROL | Tuji | Jp1/AJS | XXXXXXXXXXXXXXXXXXXXXXXXXX... |
| ▲ WARNING | 1998/01/18 2:20 | STOCK CONTROL | Tuji | Jp1/AJS | XXXXXXXXXXXXXXXXXXXXXXXXXX... |
| ■ CRITICAL | 1998/01/18 2:15 | STOCK CONTROL | Tuji | Jp1/AJS | XXXXXXXXXXXXXXXXXXXXXXXXXX... |
| ■ CRITICAL | 1998/01/18 2:00 | STOCK CONTROL | Tuji | Jp1/AJS | XXXXXXXXXXXXXXXXXXXXXXXXXX... |

SERIOUS | ALL | RETRIEVAL RESULT

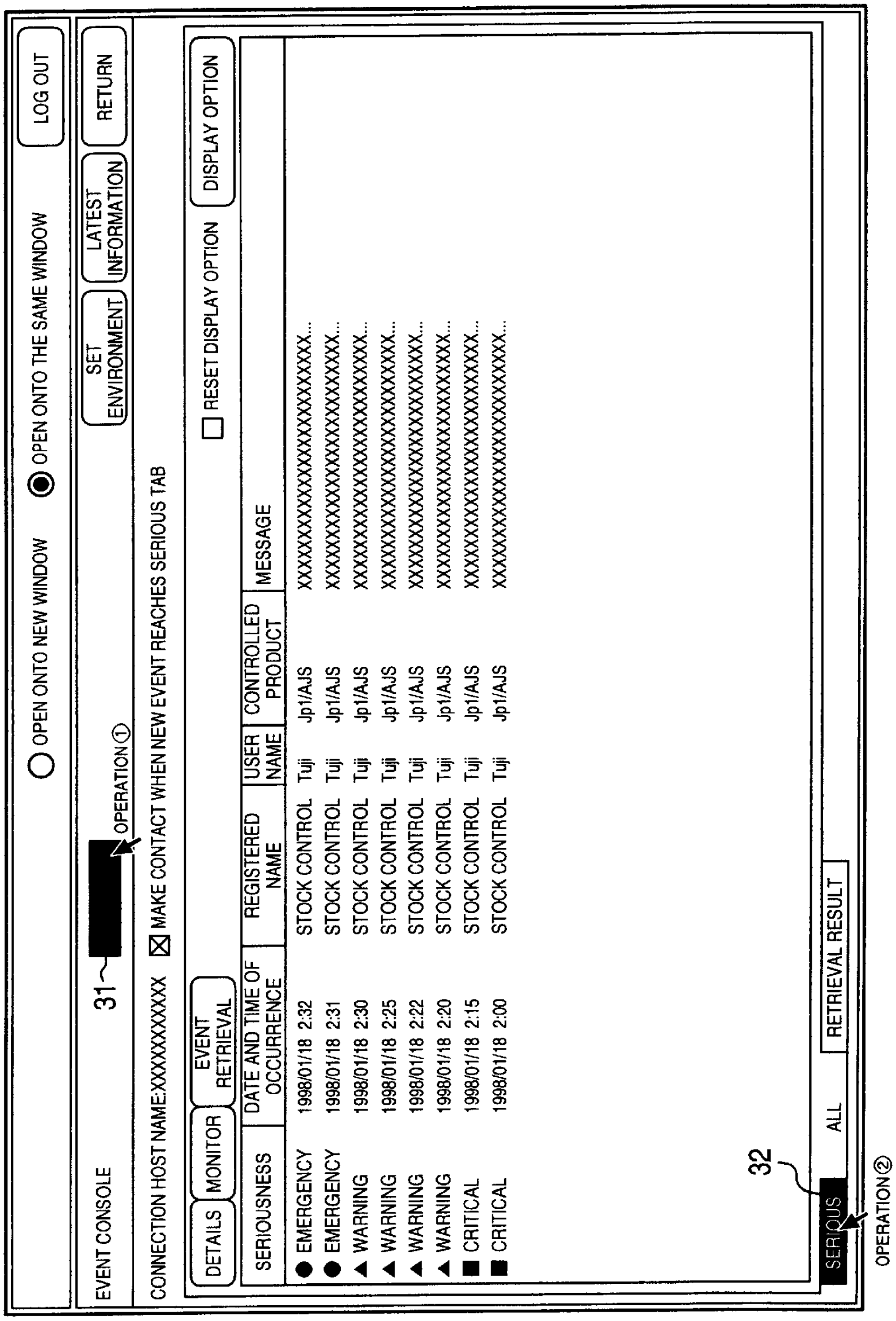

FIG. 31

| EVENT CONSOLE | | | | ○ OPEN ONTO NEW WINDOW ● OPEN ONTO THE SAME WINDOW | | LOG OUT |
|---|---|---|---|---|---|---|
| CONNECTION HOST NAME:xxxxxxxxxxx | | 31→■ ←OPERATION① ☒ MAKE CONTACT WHEN NEW EVENT REACHES SERIOUS TAB | | | SET ENVIRONMENT | LATEST INFORMATION | RETURN |

| DETAILS | MONITOR | EVENT RETRIEVAL | | | | ☐ RESET DISPLAY OPTION | DISPLAY OPTION |
|---|---|---|---|---|---|---|---|
| SERIOUSNESS | DATE AND TIME OF OCCURRENCE | REGISTERED NAME | USER NAME | CONTROLLED PRODUCT | MESSAGE | | |
| ● EMERGENCY | 1998/01/18 2:32 | STOCK CONTROL | Tuji | Jp1/AJS | xxxxxxxxxxxxxxxxxxxxxxxxx... | | |
| ● EMERGENCY | 1998/01/18 2:31 | STOCK CONTROL | Tuji | Jp1/AJS | xxxxxxxxxxxxxxxxxxxxxxxxx... | | |
| ▲ WARNING | 1998/01/18 2:30 | STOCK CONTROL | Tuji | Jp1/AJS | xxxxxxxxxxxxxxxxxxxxxxxxx... | | |
| ▲ WARNING | 1998/01/18 2:25 | STOCK CONTROL | Tuji | Jp1/AJS | xxxxxxxxxxxxxxxxxxxxxxxxx... | | |
| ▲ WARNING | 1998/01/18 2:22 | STOCK CONTROL | Tuji | Jp1/AJS | xxxxxxxxxxxxxxxxxxxxxxxxx... | | |
| ▲ WARNING | 1998/01/18 2:20 | STOCK CONTROL | Tuji | Jp1/AJS | xxxxxxxxxxxxxxxxxxxxxxxxx... | | |
| ■ CRITICAL | 1998/01/18 2:15 | STOCK CONTROL | Tuji | Jp1/AJS | xxxxxxxxxxxxxxxxxxxxxxxxx... | | |
| ■ CRITICAL | 1998/01/18 2:00 | STOCK CONTROL | Tuji | Jp1/AJS | xxxxxxxxxxxxxxxxxxxxxxxxx... | | |

32→ SERIOUS | ALL | RETRIEVAL RESULT

OPERATION②

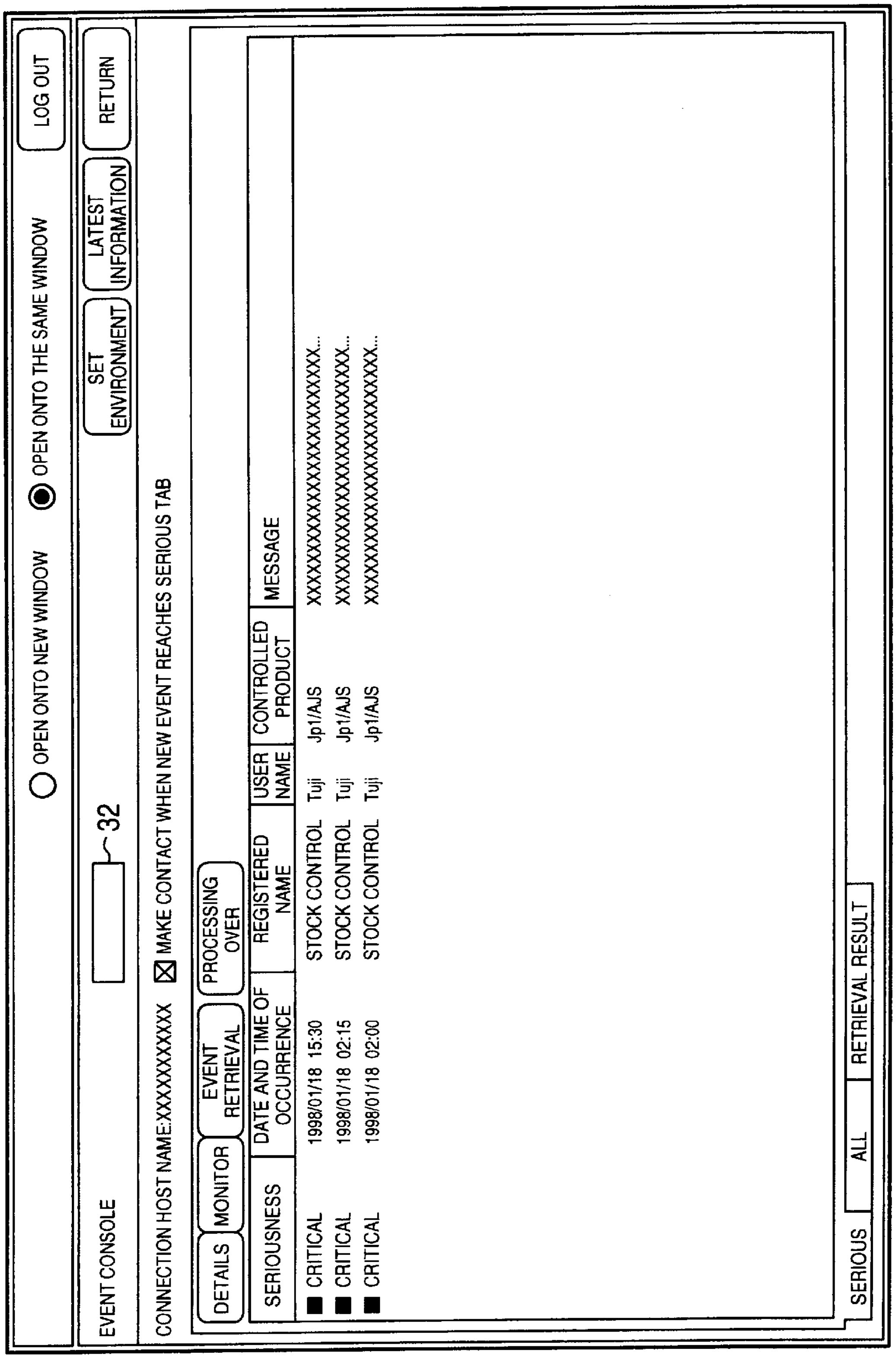

FIG. 32

EVENT CONSOLE  LOG OUT

○ OPEN ONTO NEW WINDOW  ● OPEN ONTO THE SAME WINDOW

CONNECTION HOST NAME:xxxxxxxxxxx  [32]  ☒ MAKE CONTACT WHEN NEW EVENT REACHES SERIOUS TAB

SET ENVIRONMENT | LATEST INFORMATION | RETURN

| DETAILS | MONITOR | EVENT RETRIEVAL | PROCESSING OVER | | | |
|---|---|---|---|---|---|---|
| SERIOUSNESS | DATE AND TIME OF OCCURRENCE | REGISTERED NAME | USER NAME | CONTROLLED PRODUCT | MESSAGE | |
| ■ CRITICAL | 1998/01/18 15:30 | STOCK CONTROL | Tuji | Jp1/AJS | XXXXXXXXXXXXXXXXXXXXXXXXX... |
| ■ CRITICAL | 1998/01/18 02:15 | STOCK CONTROL | Tuji | Jp1/AJS | XXXXXXXXXXXXXXXXXXXXXXXXX... |
| ■ CRITICAL | 1998/01/18 02:00 | STOCK CONTROL | Tuji | Jp1/AJS | XXXXXXXXXXXXXXXXXXXXXXXXX... |

SERIOUS | ALL | RETRIEVAL RESULT

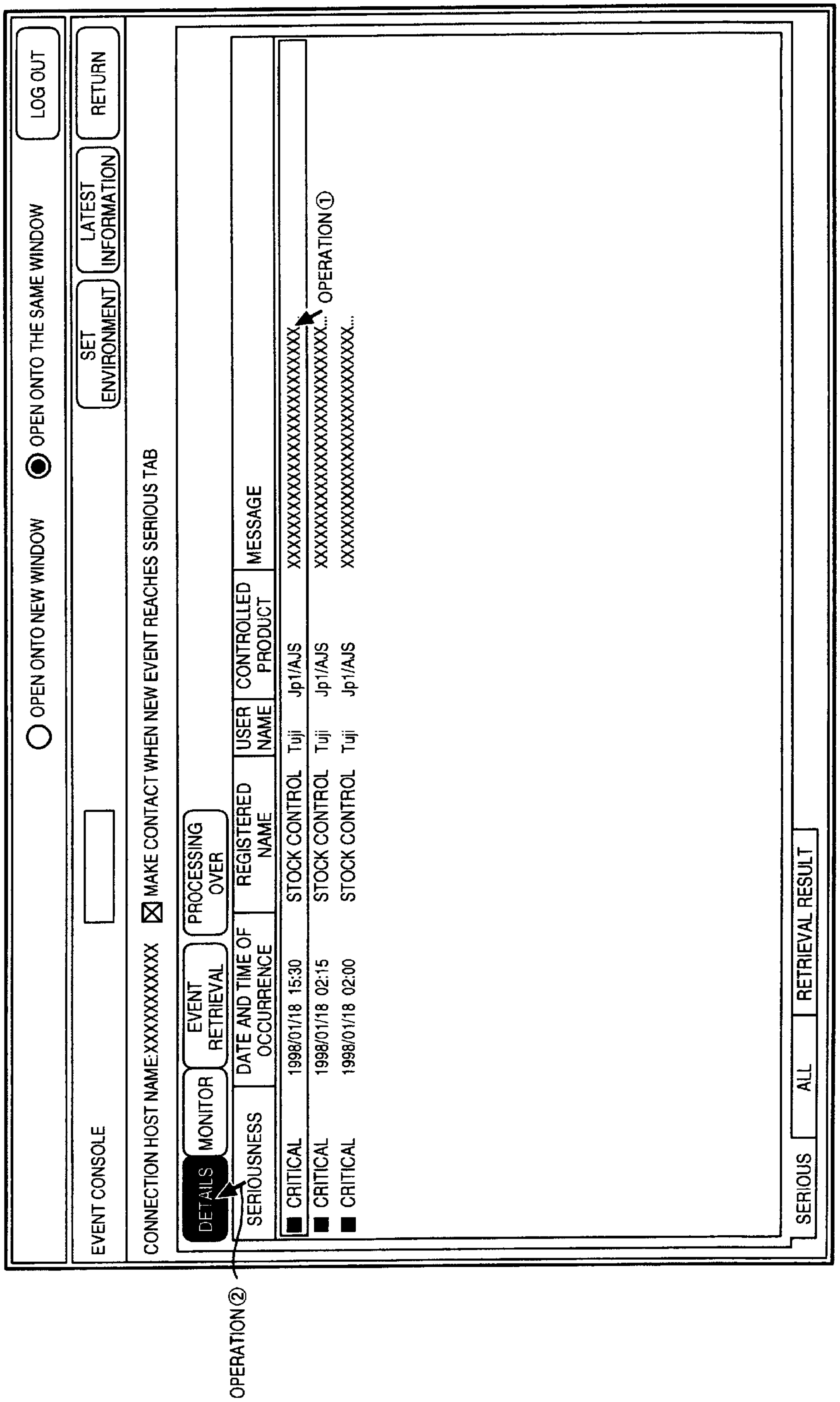

FIG. 33

EVENT CONSOLE

CONNECTION HOST NAME:xxxxxxxxxxx   ☒ MAKE CONTACT WHEN NEW EVENT REACHES SERIOUS TAB

[MONITOR] [DETAILS]  [EVENT RETRIEVAL]  [PROCESSING OVER]

○ OPEN ONTO NEW WINDOW   ● OPEN ONTO THE SAME WINDOW

[SET ENVIRONMENT] [LATEST INFORMATION] [LOG OUT] [RETURN]

| SERIOUSNESS | DATE AND TIME OF OCCURRENCE | REGISTERED NAME | USER NAME | CONTROLLED PRODUCT | MESSAGE |
|---|---|---|---|---|---|
| ■ CRITICAL | 1998/01/18 15:30 | STOCK CONTROL | Tuji | Jp1/AJS | xxxxxxxxxxxxxxxxxxxxxxxxxx |
| ■ CRITICAL | 1998/01/18 02:15 | STOCK CONTROL | Tuji | Jp1/AJS | xxxxxxxxxxxxxxxxxxxxxxxxxxxxxxxx...OPERATION① |
| ■ CRITICAL | 1998/01/18 02:00 | STOCK CONTROL | Tuji | Jp1/AJS | xxxxxxxxxxxxxxxxxxxxxxxxxx |

[SERIOUS] [ALL] [RETRIEVAL RESULT]

OPERATION②

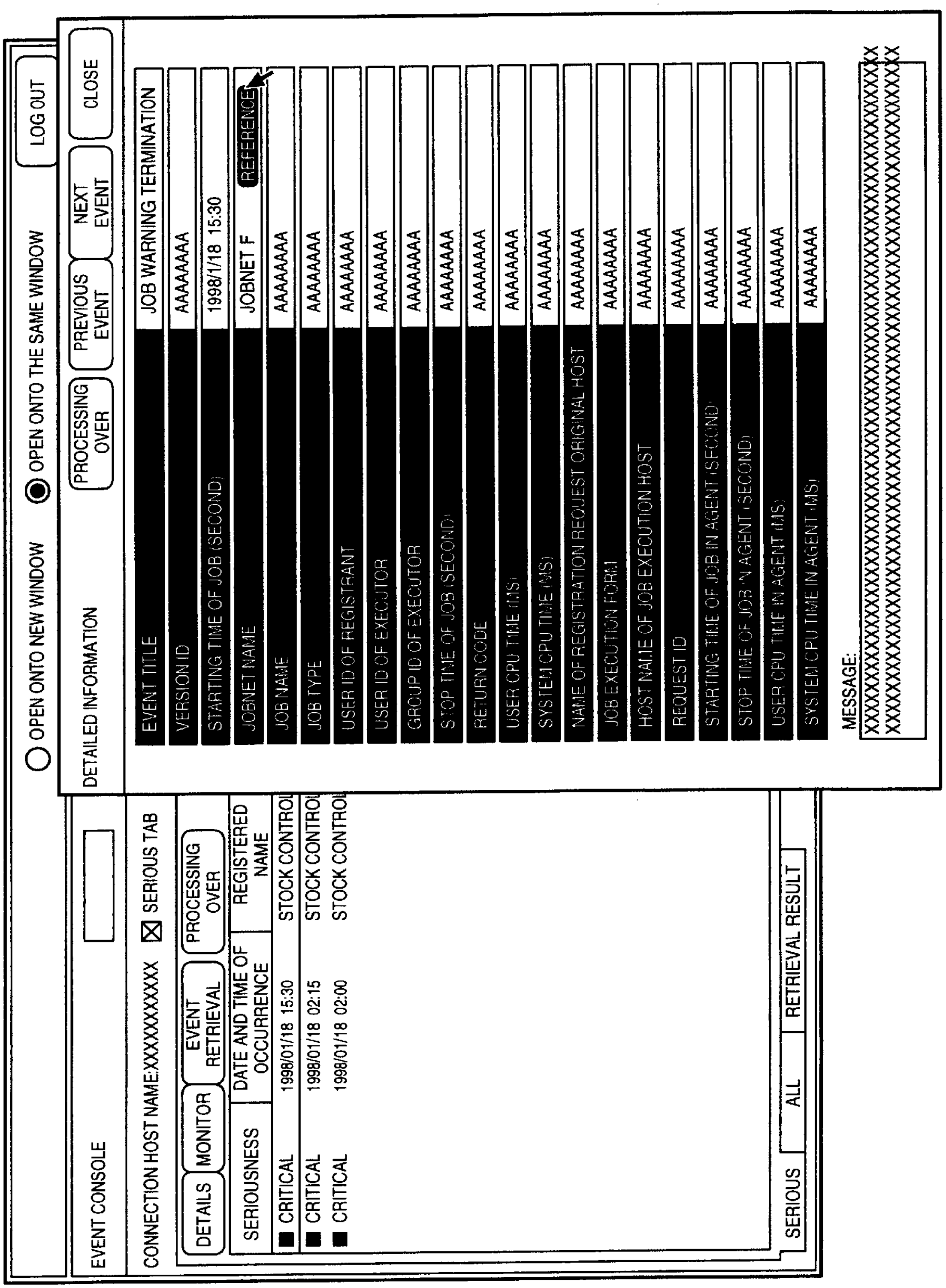

FIG. 34

EVENT CONSOLE

CONNECTION HOST NAME:XXXXXXXXXXX  ☒ SERIOUS TAB

| DETAILS | MONITOR | EVENT RETRIEVAL | PROCESSING OVER | REGISTERED NAME |
|---|---|---|---|---|

| SERIOUSNESS | DATE AND TIME OF OCCURRENCE | | | |
|---|---|---|---|---|
| ■ CRITICAL | 1998/01/18 15:30 | | | STOCK CONTROL |
| ■ CRITICAL | 1998/01/18 02:15 | | | STOCK CONTROL |
| ■ CRITICAL | 1998/01/18 02:00 | | | STOCK CONTROL |

| SERIOUS | ALL | RETRIEVAL RESULT |
|---|---|---|

○ OPEN ONTO NEW WINDOW   ● OPEN ONTO THE SAME WINDOW

DETAILED INFORMATION    [PROCESSING OVER]  [PREVIOUS EVENT]  [NEXT EVENT]  [LOG OUT]  [CLOSE]

| EVENT TITLE | JOB WARNING TERMINATION |
|---|---|
| VERSION ID | AAAAAAAA |
| STARTING TIME OF JOB (SECOND) | 1998/1/18 15:30 |
| JOBNET NAME | JOBNET F  [REFERENCE] |
| JOB NAME | AAAAAAAA |
| JOB TYPE | AAAAAAAA |
| USER ID OF REGISTRANT | AAAAAAAA |
| USER ID OF EXECUTOR | AAAAAAAA |
| GROUP ID OF EXECUTOR | AAAAAAAA |
| STOP TIME OF JOB (SECOND) | AAAAAAAA |
| RETURN CODE | AAAAAAAA |
| USER CPU TIME (MS) | AAAAAAAA |
| SYSTEM CPU TIME (MS) | AAAAAAAA |
| NAME OF REGISTRATION REQUEST ORIGINAL HOST | AAAAAAAA |
| JOB EXECUTION FORM | AAAAAAAA |
| HOST NAME OF JOB EXECUTION HOST | AAAAAAAA |
| REQUEST ID | AAAAAAAA |
| STARTING TIME OF JOB IN AGENT (SECOND) | AAAAAAAA |
| STOP TIME OF JOB IN AGENT (SECOND) | AAAAAAAA |
| USER CPU TIME IN AGENT (MS) | AAAAAAAA |
| SYSTEM CPU TIME IN AGENT (MS) | AAAAAAAA |

MESSAGE:
XXXXXXXXXXXXXXXXXXXXXXXXXXXXXXXXXXXXXXXXXXXX
XXXXXXXXXXXXXXXXXXXXXXXXXXXXXXXXXXXXXXXXXXXX

DISPLAYING METHOD IN INFORMATION PROCESSING APPARATUS THAT PERMITS EXECUTION OF EITHER OBJECT OR TASK ORIENTED PROCESSINGS

BACKGROUND OF THE INVENTION

The present invention relates to a displaying method in an information processing apparatus. More particularly, it relates to a displaying method in an information processing apparatus that is capable of displaying a picture which enables a user to easily operate the information processing apparatus when he or she uses it so as to execute some kind of processing.

When a user, using an information processing apparatus, wishes to execute some kind of processing so as to accomplish a purpose, it is common for he or she to select either of the following approaches: Proceeding to processing which is oriented toward an object to be processed (referred to as object oriented processing hereinafter) or proceeding to processing which is oriented toward a task to be processed (referred to as task oriented processing).

Meanwhile, a conventional displaying method in information processing apparatuses is configured in such a manner that operation is possible from only one of the two approaches, i.e. object oriented processing or task oriented processing.

Also, processing in information processing apparatuses using the displaying method according to the conventional technique is started by an indirect operation such as a single click with a mouse with respect to a plurality of processings that are being displayed.

Moreover, as the conventional technique concerning the displaying method in information processing apparatuses, a variety of displaying methods have been proposed for an enhancement in the usability of information processing apparatuses.

In the above-described conventional techniques, operation is possible only from either of the approaches, i.e. object oriented processing or task oriented processing. This results in a problem that it is difficult to effectively deal with a lot of tasks and various types of objects. Also, in the conventional techniques, only either of the approaches is usable. This brings about a problem that a flexible operation is difficult to achieve.

Also, in the above-described conventional techniques, execution of a command that requires an enormous amount of access time is stated upon an indirect operation such as a single click with a mouse. This gives rise to a problem that, if a command is selected that is against an intention of the user, this operation mistake will cause an enormous amount of waiting time to occur.

Also, the above-described conventional techniques have a problem that, when a displaying is executed using an expandable/reducible tree having a hierarchical structure, it is impossible to display states, such as an emergency state of a leaf node hidden under a higher order node.

Also, in the above-described conventional techniques, information the attributes of which are different for each of a plurality of independent windows or frames are displayed on the windows or frames. This condition results in a problem that there exists a limitation to the monitor resolution and, in the case of a large number of pictures involved, the apparatus becomes difficult to operate. Also, since the plurality of pictures are displayed in parallel at a time, it is difficult to impress, on the user, a situation that one object is being displayed from a variety of viewpoints.

Also, in the above-described conventional techniques, when a lot of execution results are concentrated in a schedule area within a fixed period of time, symbols representing the execution results are displayed in a state of being physically overlapped with each other. This condition results in a problem that it is difficult to arbitrarily identify the symbols within the schedule area by operations such as the mouth operation. Incidentally, in the above description, the schedule area means an area where execution results of a Job and a JobNet, i.e. execution forms, are displayed in time series with the use of tabular form.

Also, the above-described conventional techniques have a problem that when, in a display using a tab, an event requiring an emergent processing occurs within a tab, the conventional technique, if the tab is hidden, is incapable of displaying the event that has occurred within the hidden tab.

SUMMARY OF THE INVENTION

It is a first object of the present invention to provide, by solving the above-mentioned problems in the conventional techniques, a displaying method in an information processing apparatus that makes the following processings possible: Executing the operation from either of the two approaches, i.e. the processing oriented toward an object to be processed or the processing oriented toward a task to be processed, and effectively dealing with a lot of tasks and various types of objects, and achieving a flexible operation.

Also, it is a second object of the present invention to provide a displaying method in an information processing apparatus that decreases operation mistakes such as selection of a command that is against an intention of the user, thereby preventing a waiting time due to the operation mistakes from occurring.

Also, it is a third object of the present invention to provide a displaying method in an information processing apparatus that makes the following processings possible: Displaying states such as an emergency state of a leaf node hidden under a higher order node when a displaying is executed using an expandable/reducible tree having a hierarchical structure, and impressing on the user a situation that one object is being displayed from a variety of viewpoints even when a plurality of pictures are displayed in parallel at a time.

Also, it is a fourth object of the present invention to provide a displaying method in an information processing apparatus that, even when a lot of execution results are concentrated in the schedule area within a fixed period of time, prevents symbols representing the execution results from being physically overlapped with each other, thereby making it possible to arbitrarily identify any symbols within the schedule area by operations such as the mouth operation.

Also, it is a fifth object of the present invention to provide a displaying method in an information processing apparatus that allows information varying with time to be displayed as a time series picture and, out of the information displayed in the time series picture, allows detailed information within a designated time period to be displayed along with time information.

Also, it is a sixth object of the present invention to provide a displaying method in an information processing apparatus that, when, in a display using a tab, an event requiring an emergent processing occurs within a tab and further even if the tab is hidden, makes it possible to display the event that has occurred within the hidden tab.

Also, it is a seventh object of the present invention to provide a displaying method in an information processing apparatus that, when a plurality of pictures are opened simultaneously, makes it possible to select whether the plurality of pictures are opened on a new window or on one and the same window.

Also, it is an eighth object of the present invention to provide a displaying method in an information processing apparatus that makes it possible to open a sub picture on one and the same window in the case where it is possible to select opening a plurality of pictures simultaneously and in addition the sub picture is a modal picture and thus it is impossible to perform a deactivated control of operation of a parent picture.

According to one aspect of the present invention, in a displaying method in an information processing apparatus, the above-described first object is accomplished by the following transactions: Displaying on a display apparatus both a display that permits a task to be processed to be selected and a display that permits an object to be processed to be selected, and making it possible to execute in an arbitrary order a step of selecting the task to be processed and a step of selecting the object to be processed, and also displaying the display that permits the task to be processed to be selected and the display that permits the object to be processed to be selected in such a manner that the two displays are separated into two tabs, respectively.

Also, the above-described first object is accomplished by the following transactions: If the task to be processed is selected, an object to be processed that is processible by the selected task to be processed is displayed, and if the object to be processed is selected, a task to be processed that is capable of processing the selected object to be processed is displayed.

Also, in a displaying method in an information processing apparatus that displays on a display apparatus both a display that permits a task to be processed to be selected and a display that permits an object to be processed to be selected, and makes it possible to execute in an arbitrary order a step of selecting the task to be processed and a step of selecting the object to be processed, the above-described second object is accomplished by the following transaction: If a processing of performing an access through a network is selected, the access is started after a two-step operation has been executed.

Also, in a displaying method in an information processing apparatus, the above-described third object is accomplished by displaying an emergency or error state of a layer node that is even lower than the lowest layer node displayed in an interface having a hierarchical structure, the layer node not being displayed in the interface.

Also, in a displaying method in an information processing apparatus, the above-described fourth object is accomplished by the following transactions: Displaying information varying with time as a time series picture, and displaying details of the information as another picture, and in addition, making it possible to perform a switching between the display in the time series picture and the display in another picture, and also displaying, regardless of the switching, information on a hierarchical structure of an interface that is common to the display in the time series picture and the display in another picture.

Also, in a displaying method in an information processing apparatus, the above-described fifth object is accomplished by displaying information varying with time as a time series picture and by displaying, out of the information displayed in the time series picture, detailed information within a designated time period along with the time information.

Also, in a displaying method in an information processing apparatus, the above-described sixth object is accomplished by the following transactions: Information are presented within a plurality of tabs and, when the predetermined state is generated within a tab being not displayed, the event is displayed on the displayed picture.

Also, in a displaying method in an information processing apparatus, the above-described seventh object is accomplished by making it possible to select whether a plurality of pictures are opened on a new window or on one and the same window when the plurality of pictures are opened simultaneously.

Also, in a displaying method in an information processing apparatus, the above-described eighth object is accomplished by the following transactions: Making it possible to open a sub picture on one and the same window when it is possible to select opening a plurality of pictures simultaneously and in addition the sub picture is a modal picture and thus it is impossible to perform a deactivated control of operation of a parent picture, and also when a plurality of items and a plurality of item contents are displayed in correspondence with each other, displaying them in such a manner that, for each of display areas of the items and for each of the item contents, a color of the background or a color of the character is changed.

Incidentally, in the above description, the word "modal" means that, when a sub picture opened from a picture is modal, it is impossible to perform operation of the original picture while the sub picture is being displayed. Also, in the following explanation of embodiments in the present invention, the word "modeless" means that, when a sub picture opened from a picture is modeless, it is possible to perform, while the sub picture is being displayed, operation of the original picture in parallel with the sub picture.

BRIEF DESCRIPTION OF THE DRAWINGS

FIG. 30 is a diagram explaining an example of a display picture displayed by an operation processing according to the present invention;

FIG. 31 is a diagram explaining an example of a display picture displayed by an operation processing according to the present invention;

FIG. 32 is a diagram explaining an example of a display picture displayed by an operation processing according to the present invention;

FIG. 33 is a diagram explaining an example of a display picture displayed by an operation processing according to the present invention;

FIG. 34 is a diagram explaining an example of a display picture displayed by an operation processing according to the present invention;

DESCRIPTION OF THE EMBODIMENTS

Using the accompanying drawings, detailed explanation will be given hereinafter concerning an embodiment of a displaying method in an information processing apparatus according to the present invention.

Figure 1:
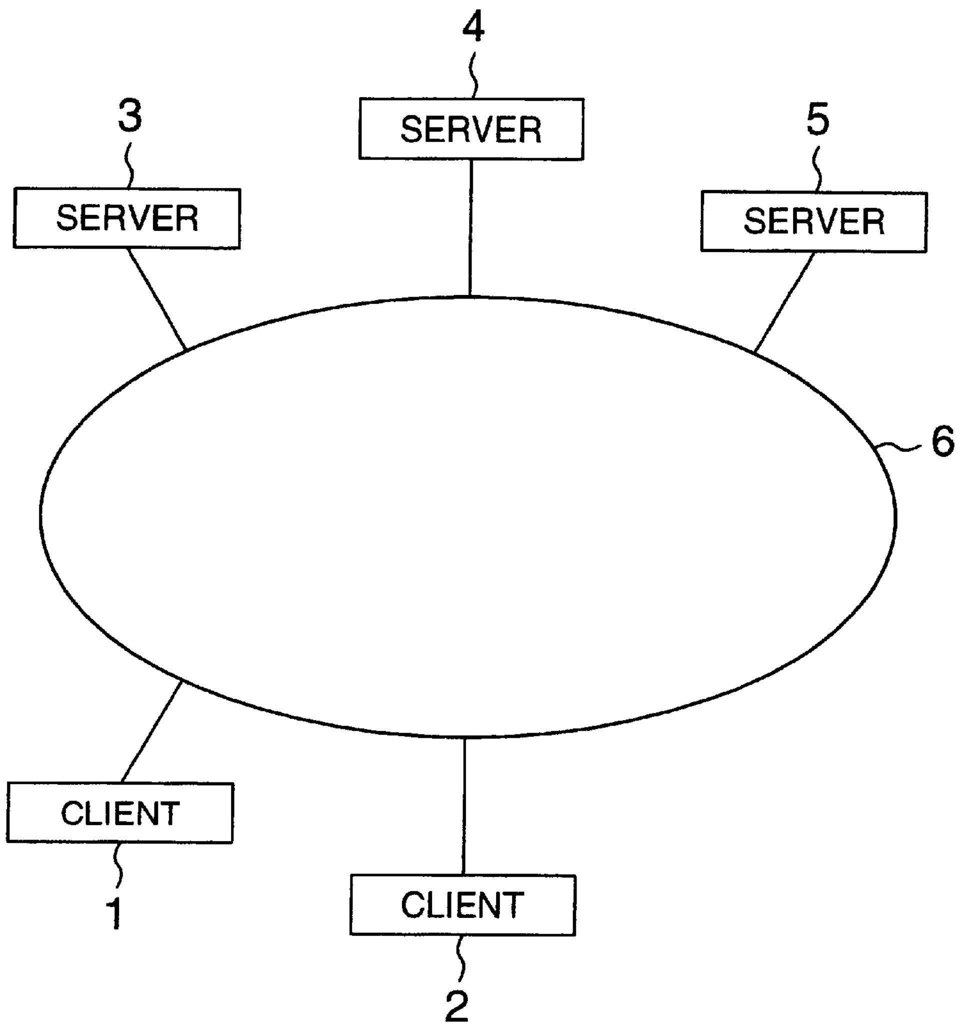
FIG. 1 is a block diagram illustrating a system configuration explaining a use environment of an information processing apparatus that executes a displaying method according to the present invention.

FIG. 1 is a block diagram illustrating a system configuration explaining a use environment of an information processing apparatus that executes a displaying method according to the present invention. FIGS. 2 to 13 are flow charts explaining various types of processing actions in which the displaying method according to the embodiment of the present invention is used. FIGS. 14 to 41 are diagrams explaining examples of pictures displayed by the processings in FIGS. 2 to 13. In FIG. 1, reference numerals 1, 2 denote clients, 3 to 5 denote servers, and 6 denotes a network.

An information processing apparatus that executes the displaying method, as illustrated in FIG. 1, may be the client 1 or 2 connected with the network 6. Information processing apparatuses as a plurality of servers 3 to 5 are connected with the network 6. In an example illustrated in FIG. 1, the two units of information processing apparatuses as the clients and the three units of information processing apparatuses as the servers are connected with the network. Additionally, it is allowable that, as these clients and servers, even larger numbers of information processing apparatuses are connected with the network.

Hereinafter, the displaying method according to the embodiment of the present invention will be explained as an action by the information processing apparatus as the client. Incidentally, an example of the action described below will be explained, assuming that an operation toward an application such as Java applet displayed within a Web browser is executed.

Figure 2:
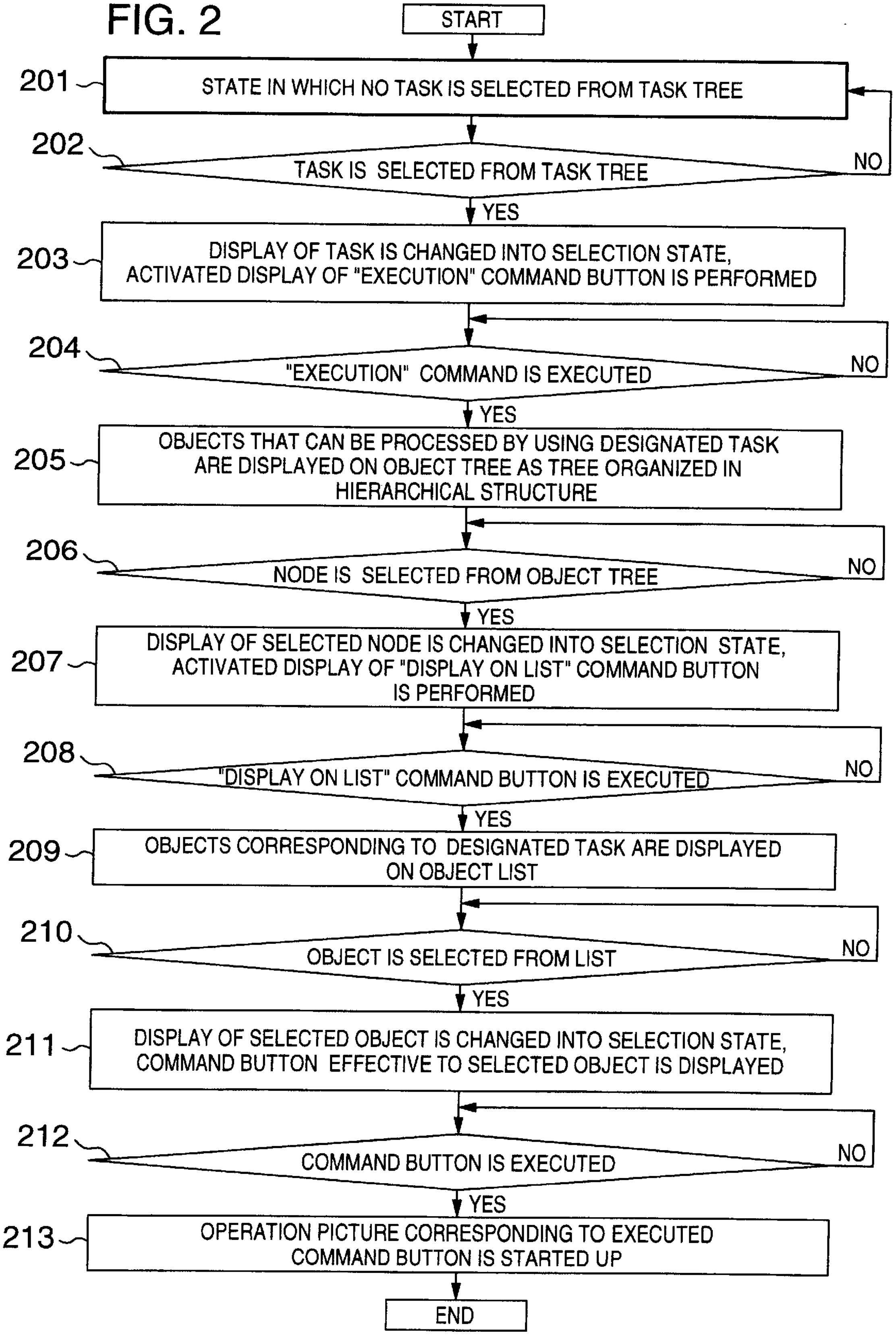
FIG. 2 is a flow chart explaining an operation processing in the case of performing a task-oriented operation.

FIG. 2 is a flow chart explaining an operation processing in the case of performing a task-oriented operation. This flow chart will be explained below, referring to the examples of the displayed pictures illustrated in FIG. 14 or the drawings thereafter.

(1) The user starts the information processing apparatuses and logs in to the server. If the log-in is authenticated, an initial picture is displayed. The initial picture, although not illustrated, may be in a state in which, in an example of a picture illustrated in FIG. 14, two tabs 141 are displayed selectively. In order to execute the task-oriented operation from this initial picture, a tab 141 indicated as "Task tree" is selected (In the explanation hereinafter, it is assumed that any selection on a picture is executed by positioning a mouse cursor onto the place and clicking on a mouse button). Then, operating the execution button displays the display picture illustrated in FIG. 14. This display picture is a picture on which the selection of "Task tree" causes a task tree to be displayed within a task tree display window 142. Incidentally, notations +, –, which are placed within □ attached to each of the task names, have tasks as commands that instruct the expansion and the reduction, respectively (step 201).

Figure 14:
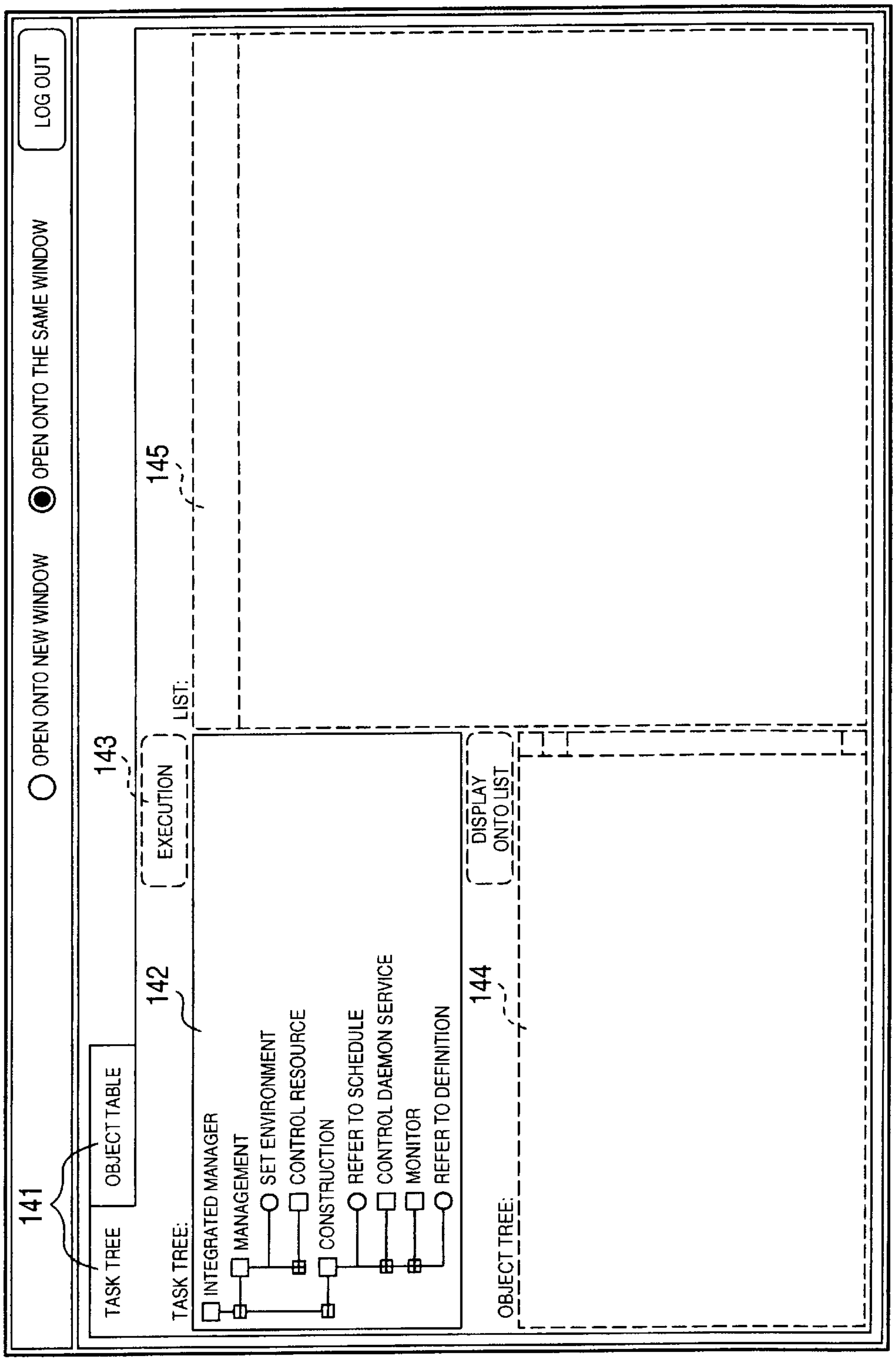
FIG. 14 is a diagram explaining an example of a display picture displayed by an operation processing according to the present invention.
Figure 15:
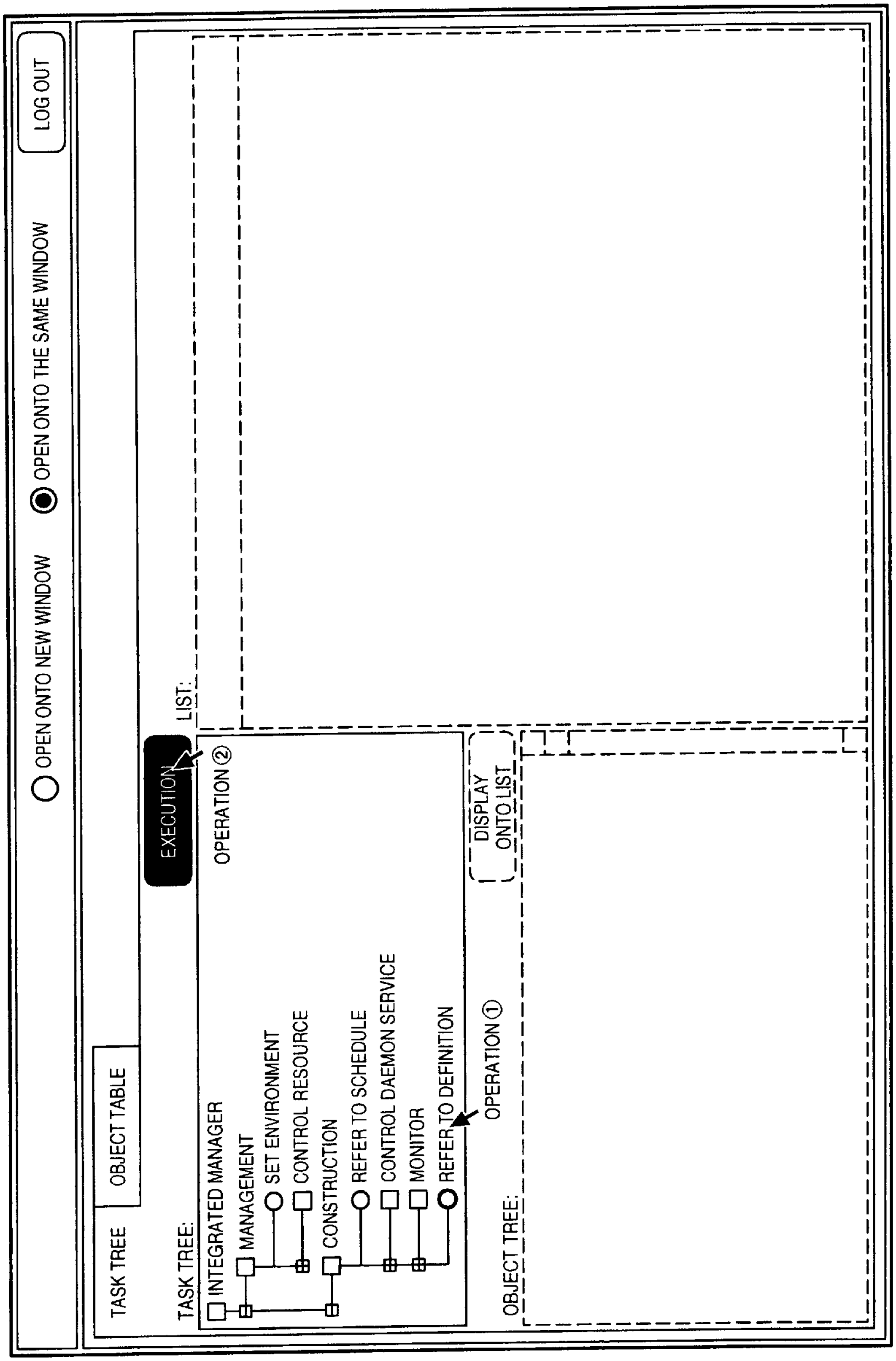
FIG. 15 is a diagram explaining an example of a display picture displayed by an operation processing according to the present invention.

(2) As illustrated in FIG. 15, if one task is selected (: operation ①) out of the task tree on the display picture illustrated in FIG. 14, the consequence is as follows: The selected one task, which, in the selection state in the illustrated example, is a task "Refer to definition", undergoes display changes such as font change, blink, color change, and filling-in of a corresponding icon. Also, the execution command button 143 is activated. The above-mentioned display changes allow the operator to make sure that, for example, the task "Refer to definition" has been selected. Also, the activation of the execution command button makes the operator clearly recognize an operation that he or she should execute next (steps 202, 203).

Figure 16:
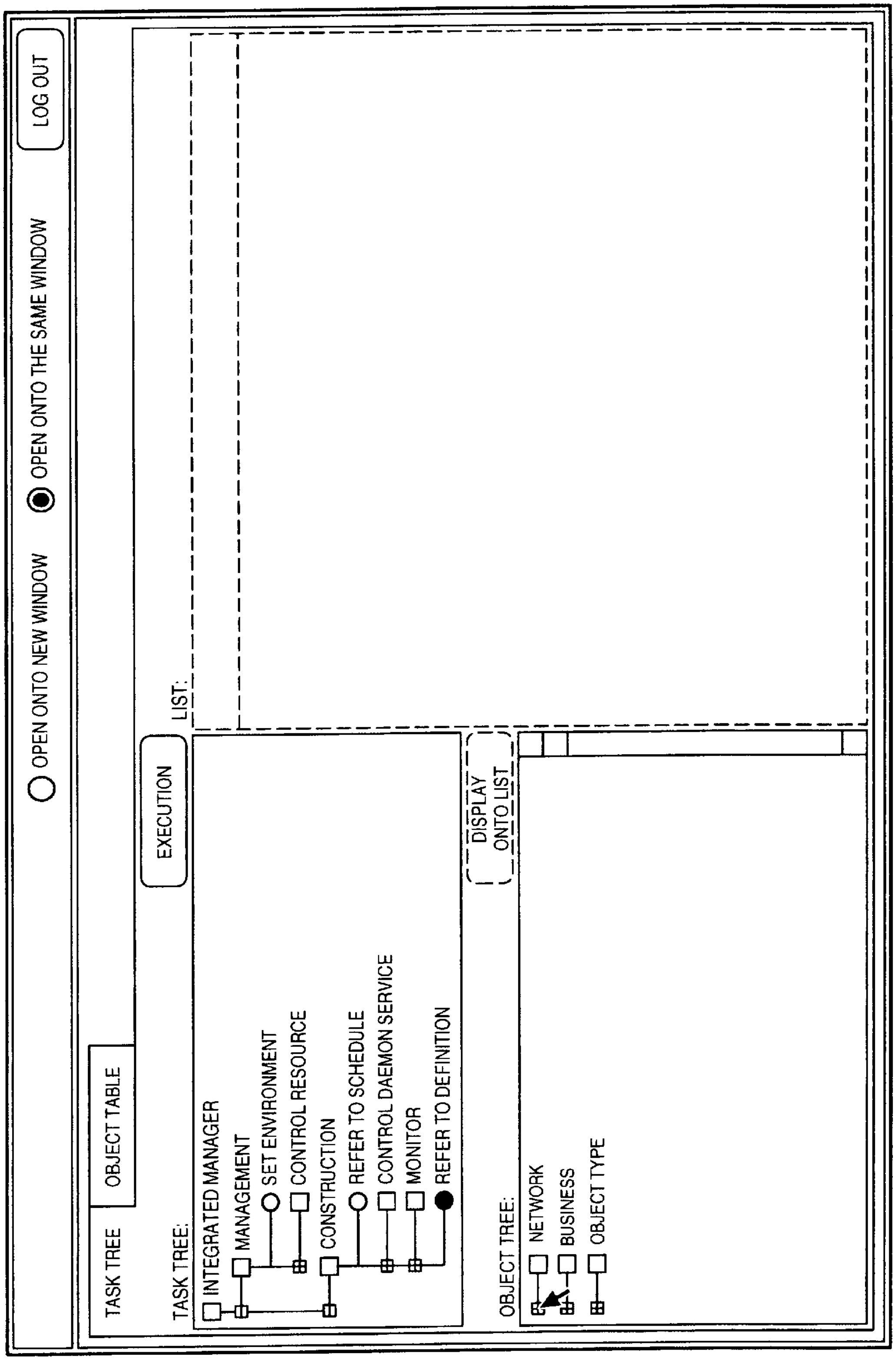
FIG. 16 is a diagram explaining an example of a display picture displayed by an operation processing according to the present invention.

(3) As illustrated in FIG. 16, selecting the execution command button (: operation ②) displays, on an object tree display window 144 and as an object tree organized in a hierarchical structure, objects that can be processed by using the task designated from the task tree. The display of the objects that can be processed by using the designated task makes it possible to avoid excessive display of information and to effectively provide information necessary for the operator. Also, the employment of the two-step operation, i.e. the further selection of the execution command after the selection of a task from the task tree, makes it possible to decrease operation mistakes such as selection of a command that is against an intention of the user. This condition makes it possible to prevent a waiting time due to the operation mistakes from occurring. This is particularly effective when dealing with a command requiring a long access time and so on (steps 204, 205).

Figure 17:
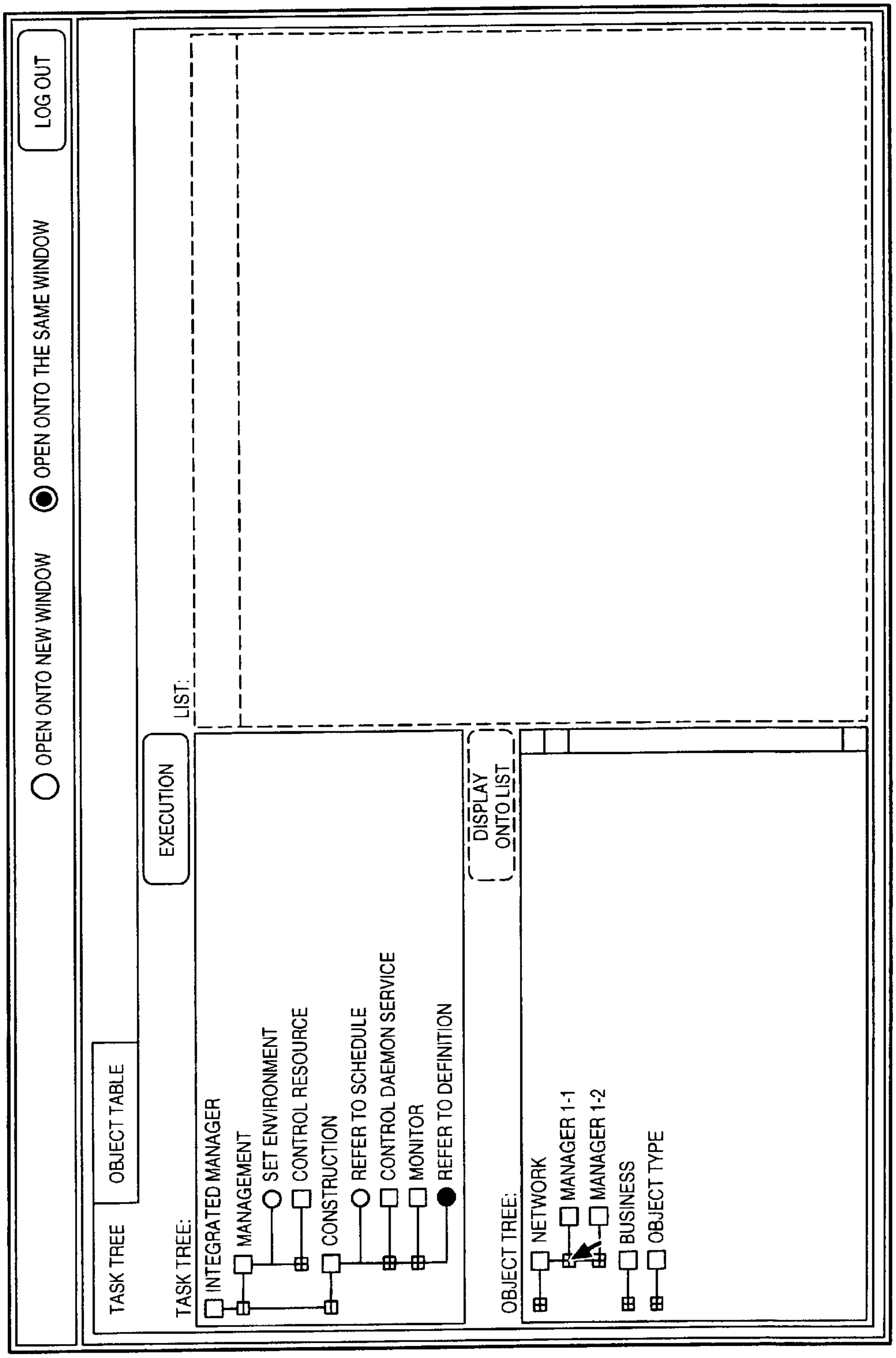
FIG. 17 is a diagram explaining an example of a display picture displayed by an operation processing according to the present invention.
Figure 18:
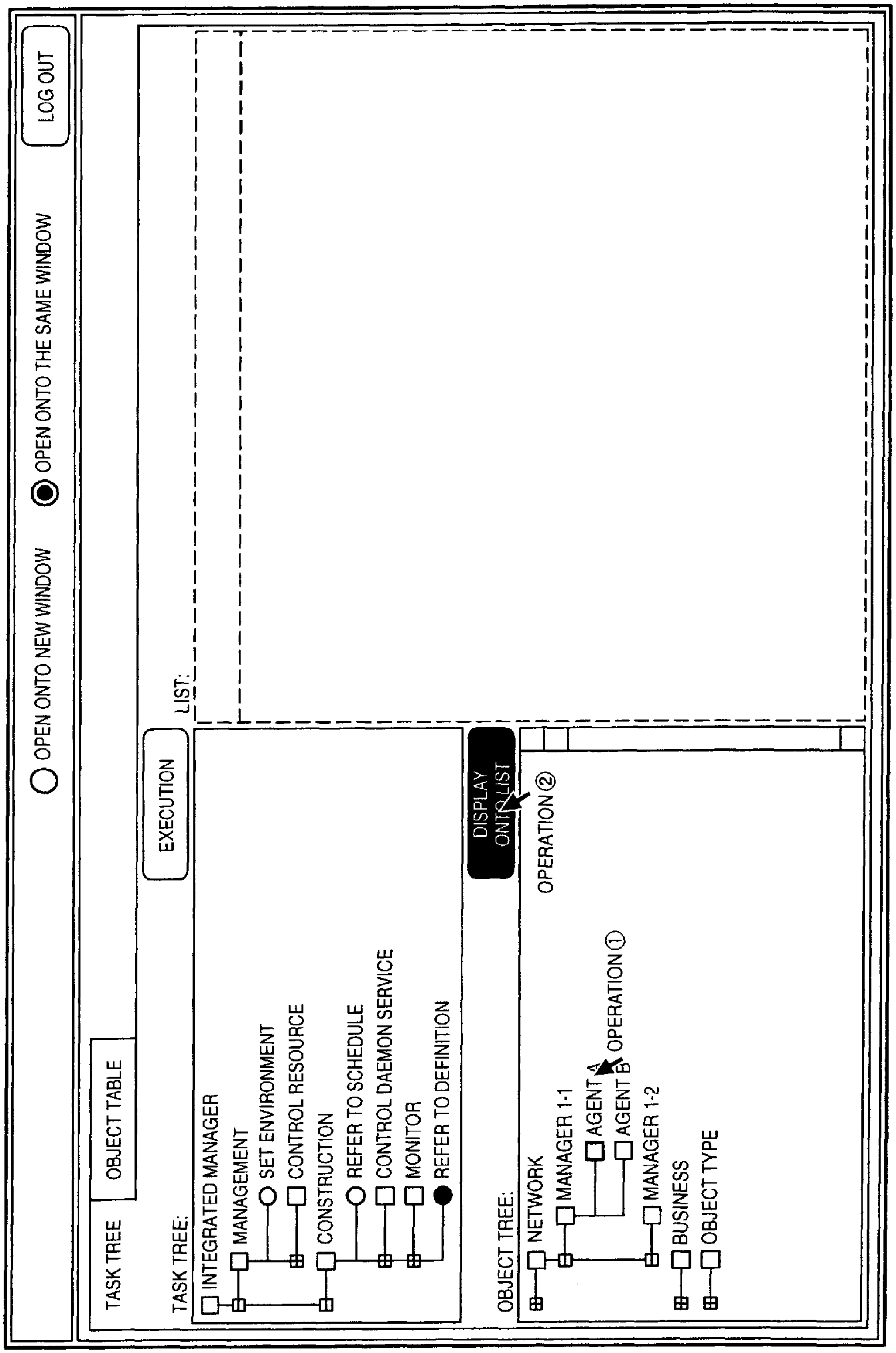
FIG. 18 is a diagram explaining an example of a display picture displayed by an operation processing according to the present invention.

(4) Selection of an expansion command of one object, for example, "Network" out of the object tree, as illustrated in FIG. 17, expands and displays a lower order hierarchy under "Network". Then, selection of "Manager" 1—1 expanded in the lower order, as illustrated in FIG. 18, expands and displays a lower order node under "Manager" 1—1 (step 206).

(5) Selecting, for example, "Agent A" from the expanded node results in a display change of this node into a selection state, and activates a command button of "Display onto list" (step 207).

Figure 19:
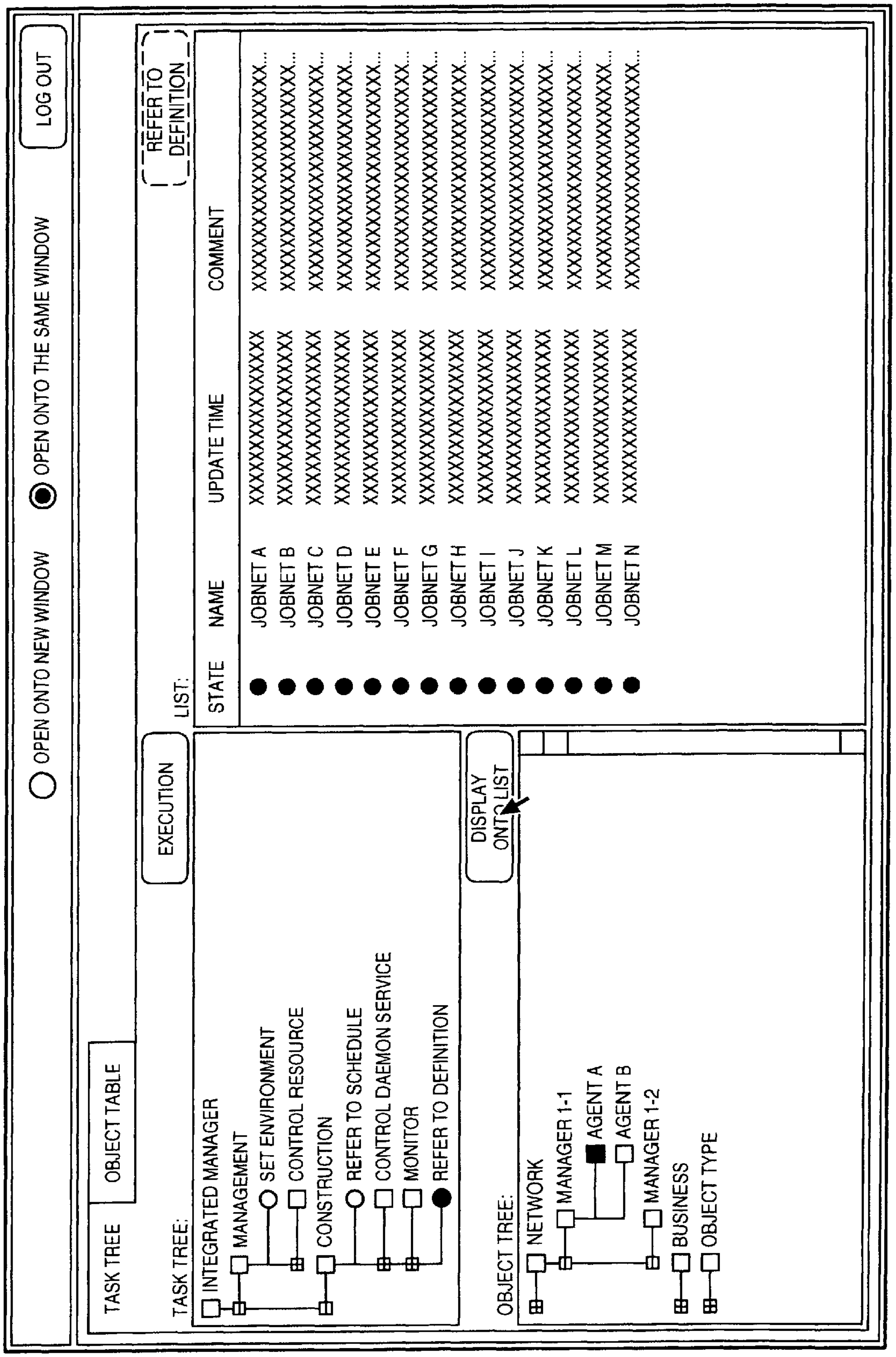
FIG. 19 is a diagram explaining an example of a display picture displayed by an operation processing according to the present invention.

(6) Operating and executing the command button of "Display onto list", as illustrated in FIG. 19, displays, on a list display window 145, a list of objects as Jobs corresponding to "Agent A" (steps 208, 209).

Figure 20:
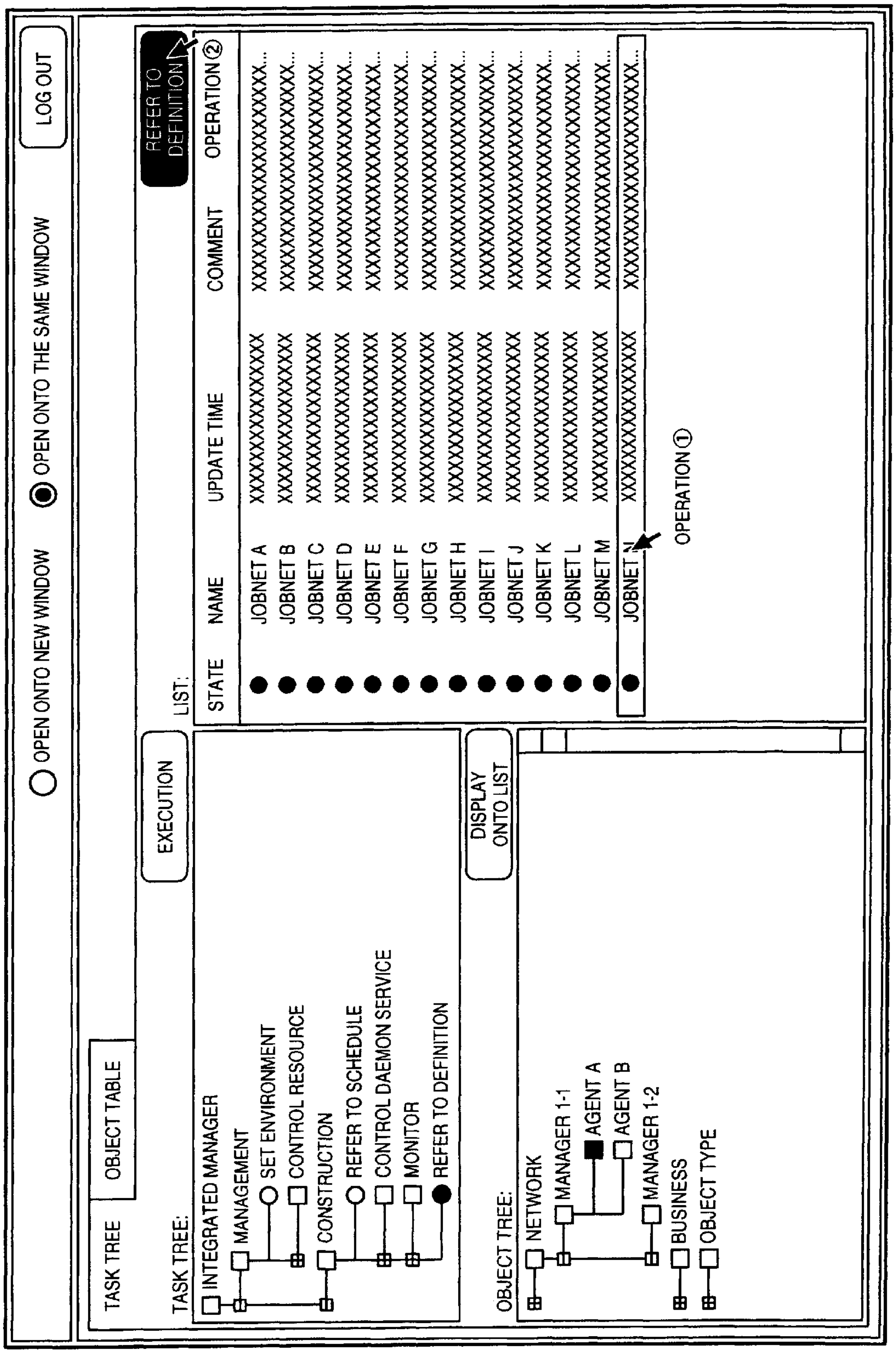
FIG. 20 is a diagram explaining an example of a display picture displayed by an operation processing according to the present invention.

(7) Selecting, as is illustrated in FIG. 20, "JobNet N" (: operation ①) from the list displayed as illustrated in FIG. 19 results in a display change of the selected object into a selection state, and activates a command button that is effective toward the selected object, which, in the illustrated example, is a command button of "Refer to definition". This allows the operator to clearly recognize an operation that he or she should perform toward the selected object next, thereby making it possible to decrease false operations and to enhance the operation efficiency (steps 210, 211).

Figure 21:
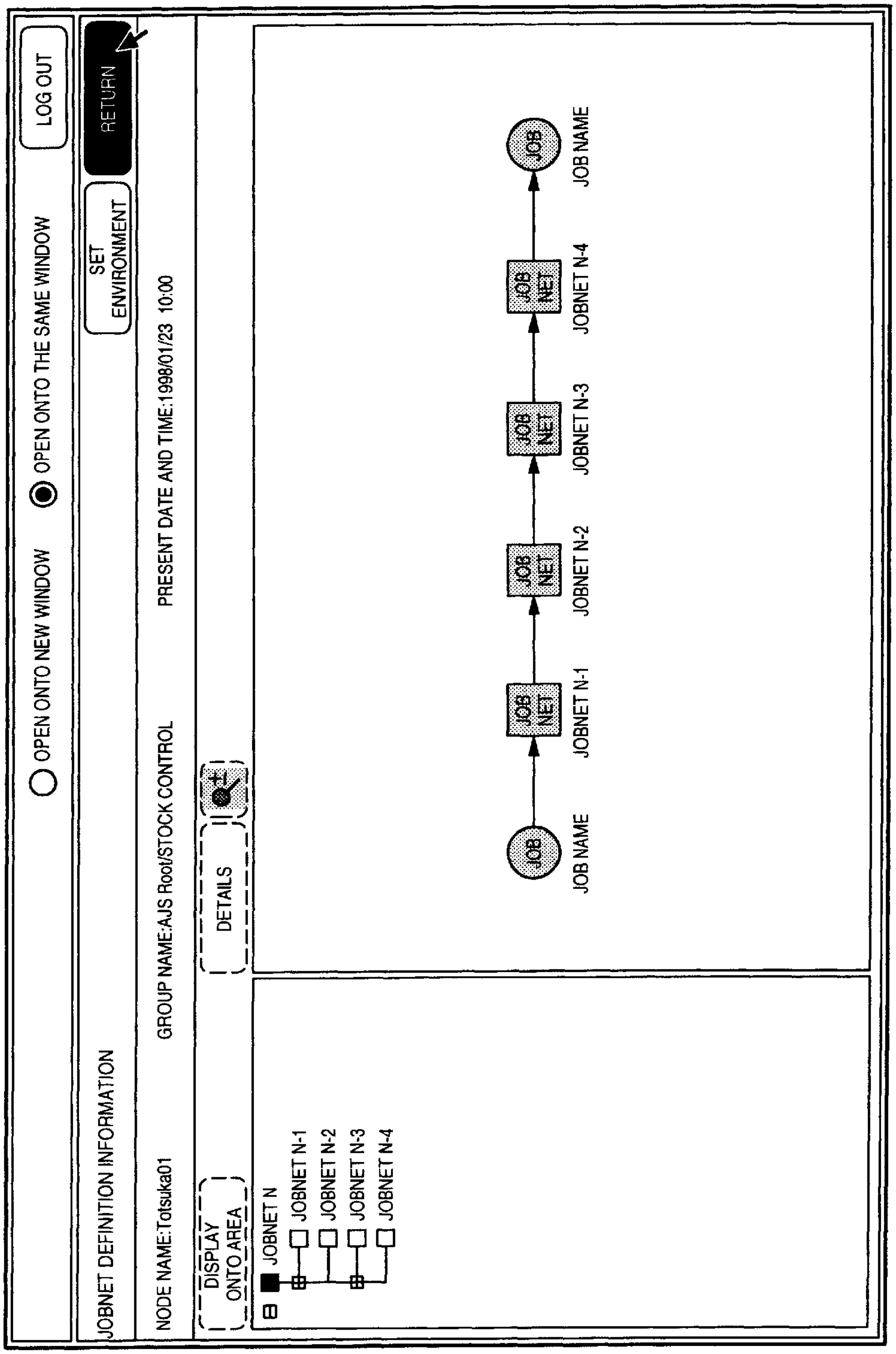
FIG. 21 is a diagram explaining an example of a display picture displayed by an operation processing according to the present invention.

(8) Operating and executing the command button of "Refer to definition" in FIG. 20 (: operation ②) starts an operation picture corresponding to the command button thus executed, thus displaying a picture of, for example, JobNet definition information illustrated in FIG. 21. Usually, this display picture makes it possible for the user to perform various types of processings. In the above-explained example, however, the processing is selected to be "Refer to definition" and thus the user simply browses the information (steps 212, 213).

Figure 3:
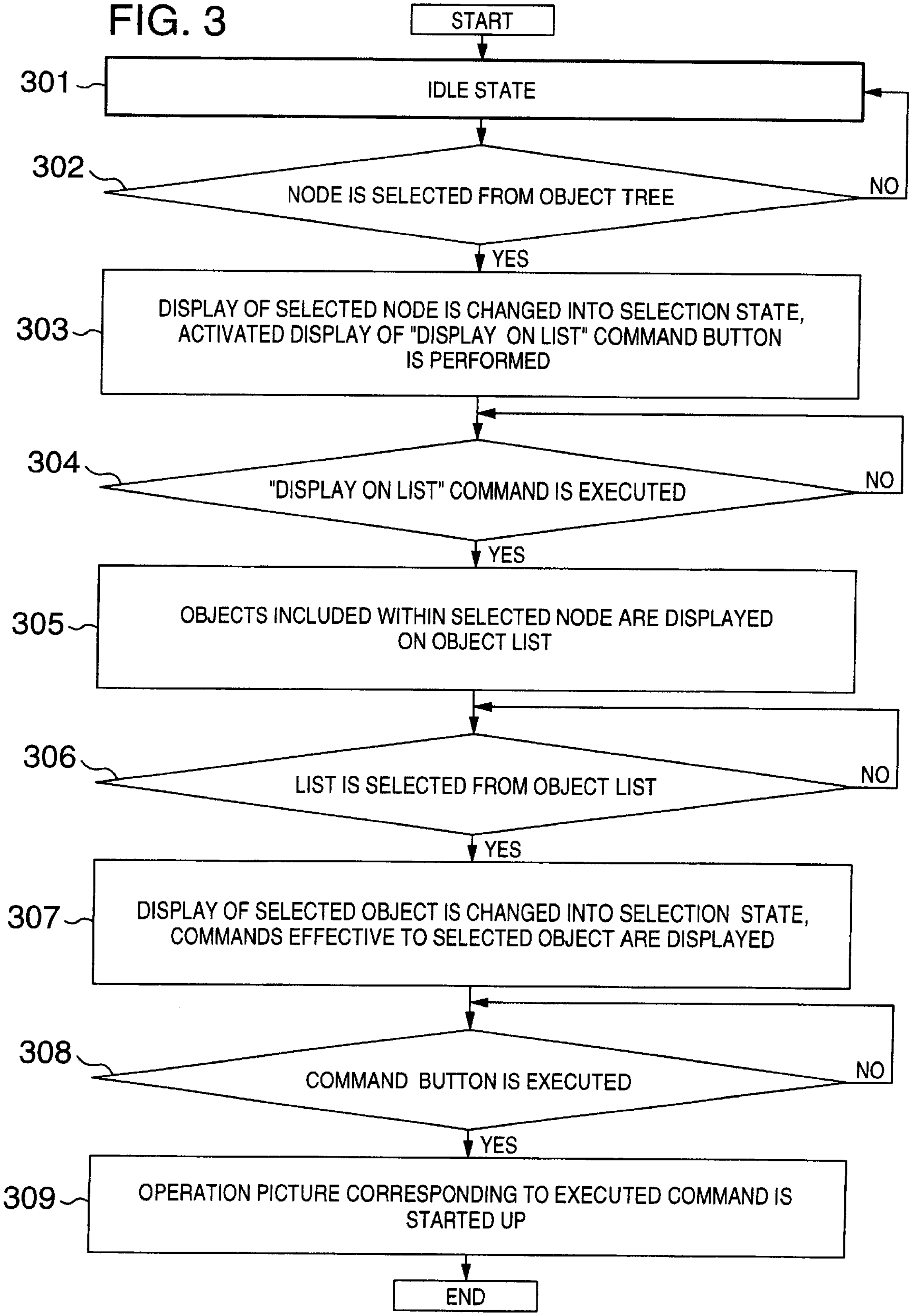
FIG. 3 is a flow chart explaining an operation processing in the case of performing an object-oriented operation.

FIG. 3 is a flow chart explaining an operation processing in the case of performing an object-oriented operation. This flow chart will be explained below, referring to the examples of the displayed pictures.

Figure 22:
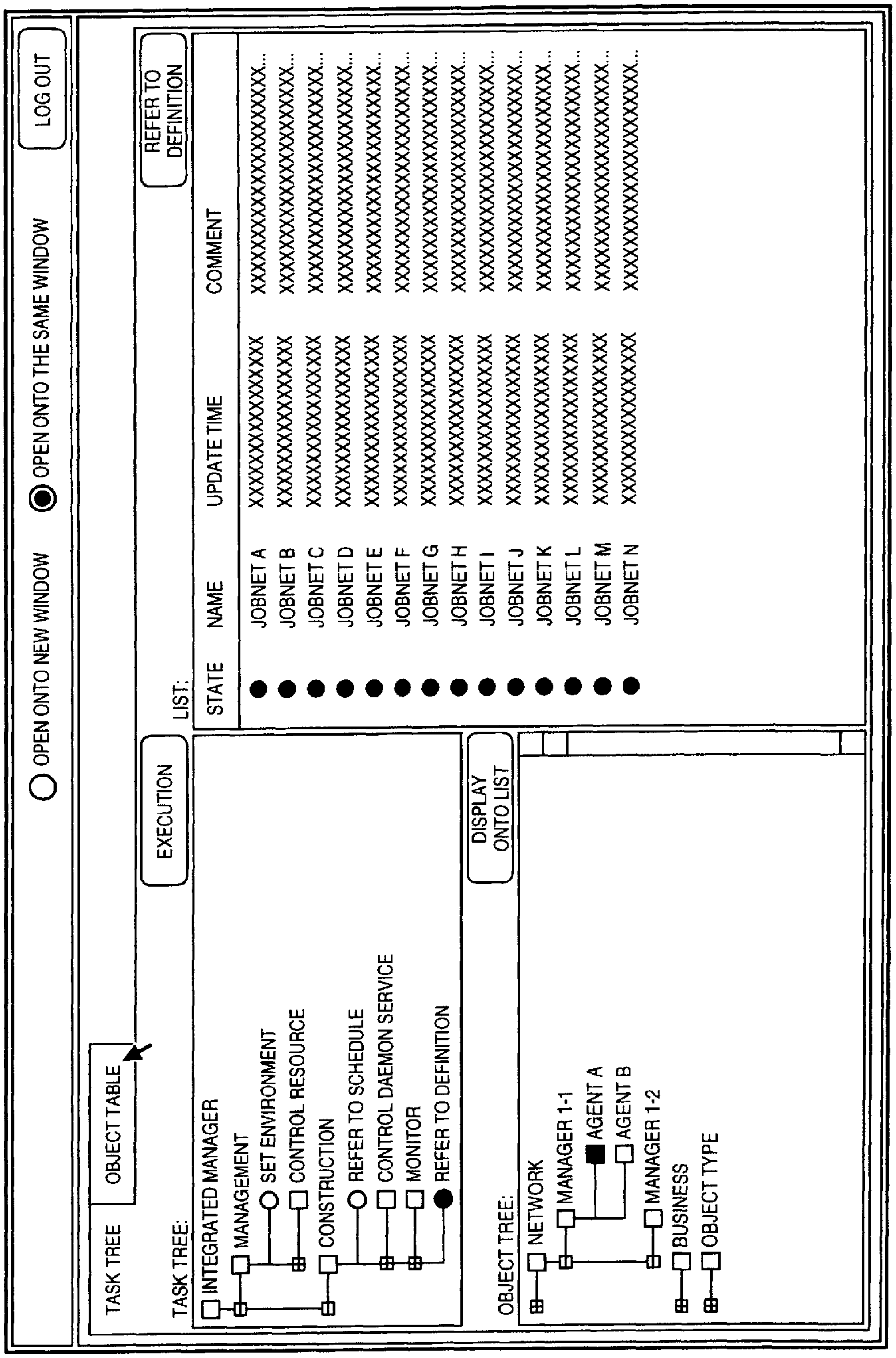
FIG. 22 is a diagram explaining an example of a display picture displayed by an operation processing according to the present invention.

(1) Similarly with the case of the flow chart illustrated in FIG. 2, the user starts the information processing apparatuses and logs in to the server, and then the log-in is authenticated. After that, in order to execute the object-oriented operation, when, in the example of the picture illustrated in FIG. 14, a tab 141 indicated as "Object table" is selected and the execution button is operated, or when, after executing a command button "Return" in the above-mentioned display picture in FIG. 21 and calling up a display picture that is illustrated in FIG. 22 and is similar to that in FIG. 20, the tab 141 indicated as "Object table" is selected, a display picture is displayed that, as illustrated in FIG. 23, is in an idle state where there is displayed an object tree that becomes an object to be processed (step 301).

Figure 23:
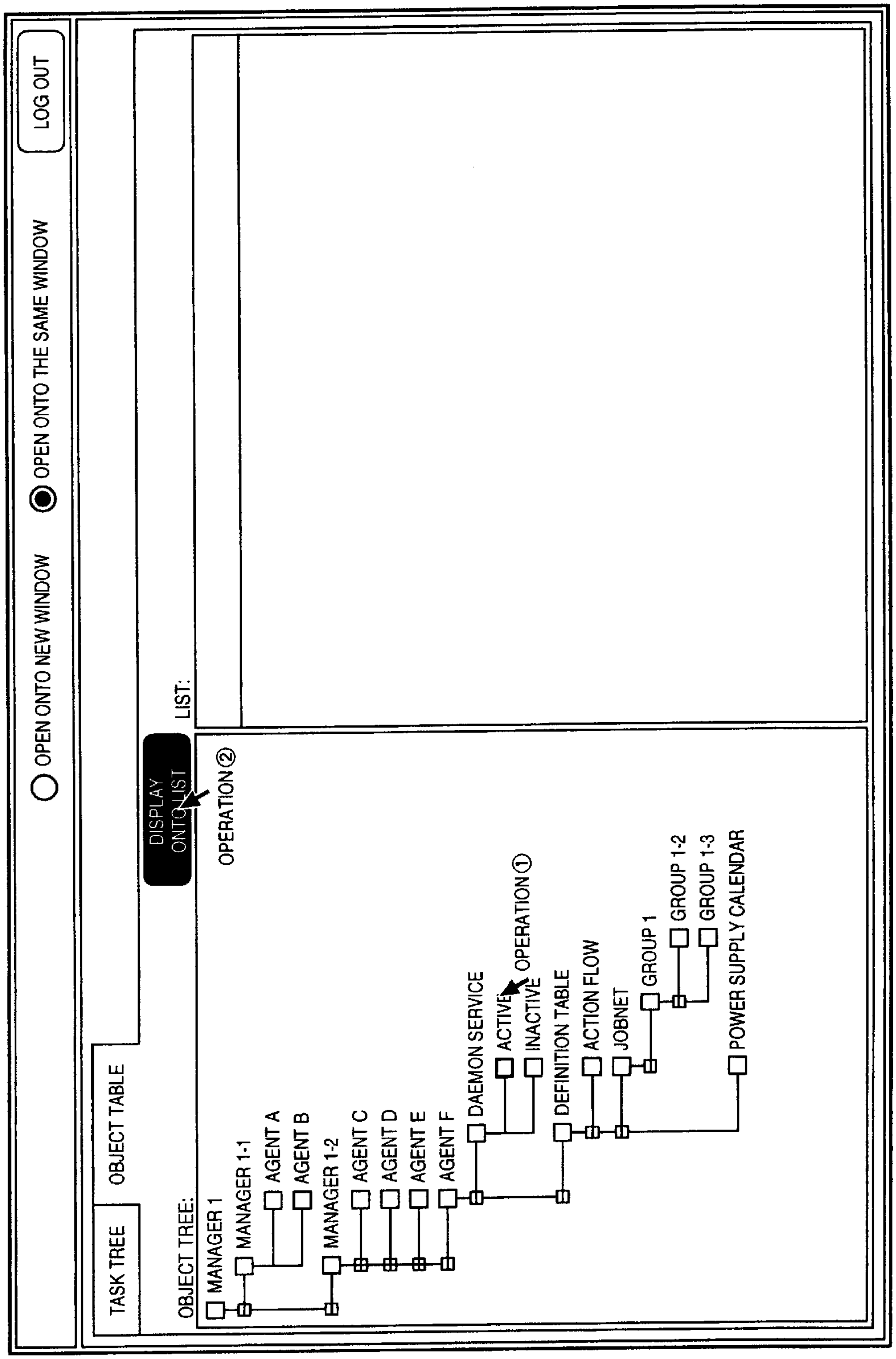
FIG. 23 is a diagram explaining an example of a display picture displayed by an operation processing according to the present invention.

(2) If one node, which, in the illustrated example, is a node "Active" that is a lower order node under "Daemon service", is selected (: operation ①) out of the object tree in the display picture illustrated in FIG. 23, a command button of "Display onto list" is activated (steps 302, 303).

Figure 24:
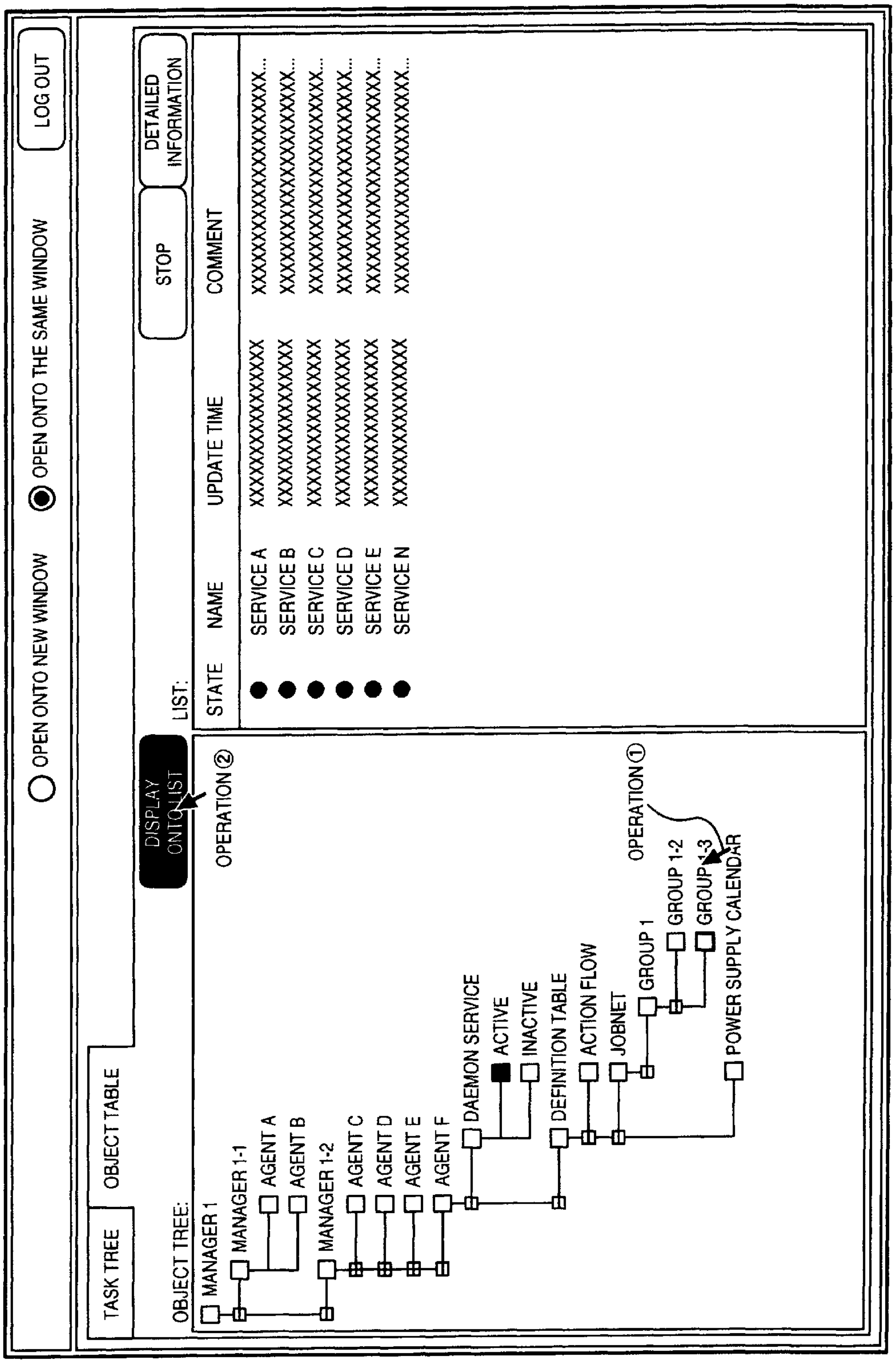
FIG. 24 is a diagram explaining an example of a display picture displayed by an operation processing according to the present invention.

(3) Here, operating and executing the command button of "Display onto list" (: operation ②), as illustrated in FIG. 24, displays, on the list display window 145 and as an object list, objects included within the selected object (steps 304, 305).

(4) In the state where the object list illustrated in FIG. 24 is displayed, if another node, which, in the illustrated example, is a node "Group 1–3" that is a lower order node under "JobNet", is selected (: operation ①) from the object tree, the selected node is changed into a selection state, and also a command button of "Display onto list" is activated. Then, operating and executing the command button (: operation ②), as illustrated in FIG. 25, displays, on the list display window 145 and as an object list, objects included within the selected object, and also command buttons that are effective toward the selected object are displayed (steps 306, 307).

Figure 25:
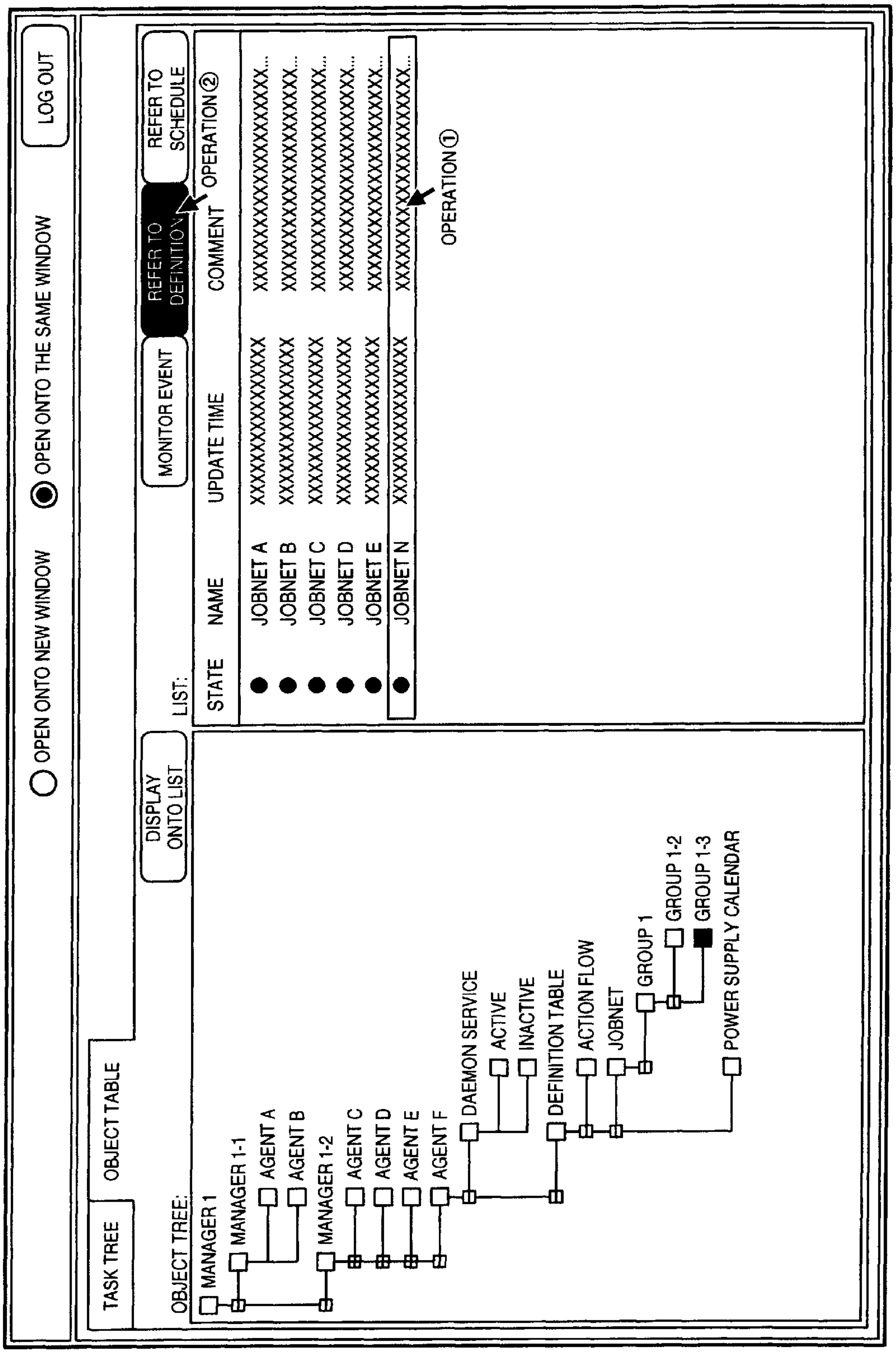
FIG. 25 is a diagram explaining an example of a display picture displayed by an operation processing according to the present invention.
Figure 26:
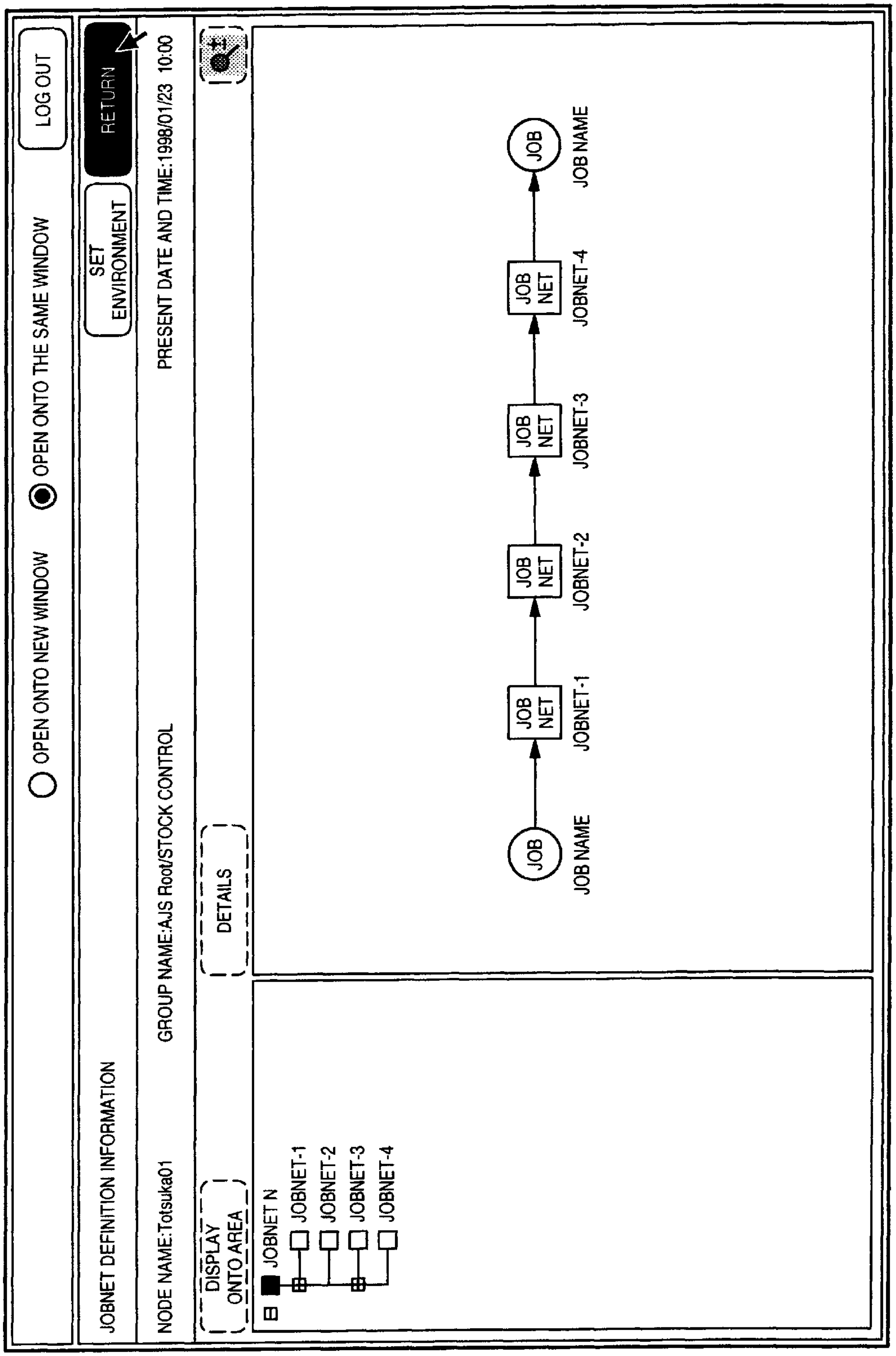
FIG. 26 is a diagram explaining an example of a display picture displayed by an operation processing according to the present invention.

(5) In the display picture illustrated in FIG. 25, selecting one of the objects, "JobNet N" (: operation ①) and executing one of the displayed command buttons, "Refer to definition" (: operation ②) starts up an operation picture corresponding to the command that is illustrated in FIG. 26 and is similar to that illustrated in FIG. 21, and, in the case of this example, displays JobNet definition information (steps 308, 309).

The processings explained using the flow charts illustrated in FIGS. 2, 3 are proceeded by repeating the operation of selecting with a mouse a node in the tree-structured display and the operation of the execution command button. By the way, a double click operation with the mouse makes it possible to display, directly as a list, objects included within a selected nod.

Figure 4:
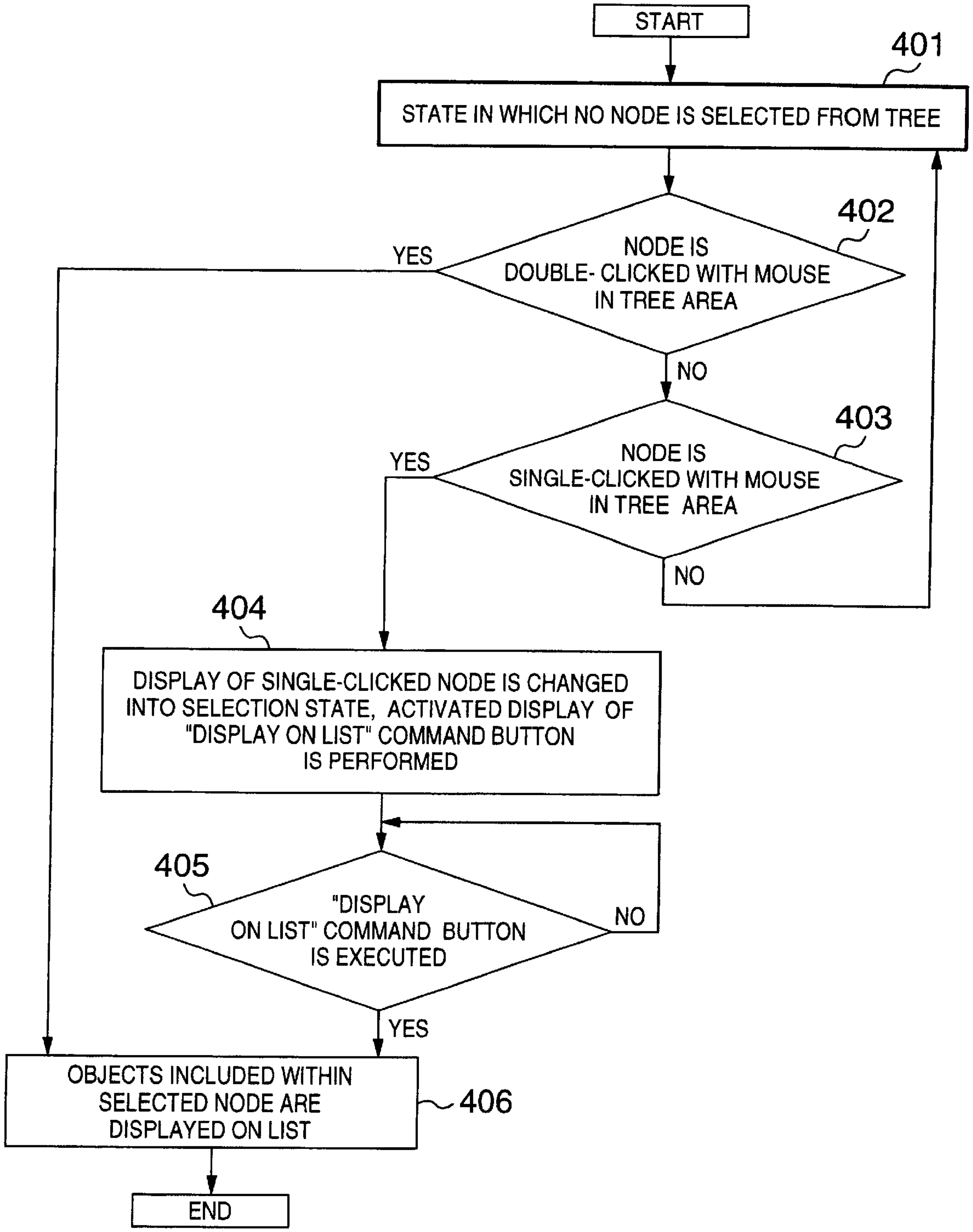
FIG. 4 is a flow chart explaining a processing in the case where the processing is executed in such a manner that a double click operation with a mouse and a single click operation therewith are differentiated and separated from each other.

FIG. 4 is a flow chart explaining a processing in the case where the processing is executed in such a manner that the double click operation with the mouse and a single click operation therewith are differentiated and separated from each other. Hereinafter, the explanation will be given concerning the flow chart.

(1) This processing is started from the above-described display picture illustrated in FIG. 14 or FIG. 23. In the display picture, when the mouse is positioned onto a node within the displayed task tree or the displayed object table tree, it is detected whether or not the node has been double-clicked (steps 401, 402).

(2) The detection of the double click with the mouse at the step 402 results in an immediate display on a display window of a tree or a list of objects included within the node of the tree onto which the mouse is positioned. Namely, without the operation of the execution command buttons, it is possible to execute the processings explained using FIGS. 2, 3. As a result, in the case of starting from FIG. 14, it is possible to obtain the display pictures illustrated in FIG. 16 and FIG. 19 without displaying the pictures existing therebetween. Also, in the case of starting from FIG. 23, it is possible to obtain the display picture illustrated in FIG. 24 or FIG. 25. The operation by the double click makes it possible to display the tree or the list of the objects more quickly. This, when the operator is accustomed to the operation, permits this method to enhance the operation efficiency further (step 406).

(3) If no double click with the mouse is detected at the step 402, it is detected whether or not the mouse has been single-clicked. If not detected, the state in the display picture in FIG. 14 or FIG. 23 remains unchanged. Also, if the single click is detected, the same processings as those explained in the flow charts illustrated in FIGS. 2, 3 allow the display picture to be altered in the same way. The operation by the selection of the single click and the command buttons enables the operation mistakes to be decreased, thus making it possible to more securely display a picture that the operator intends to display. When the operator is unaccustomed to the operation or the access requires a long time, this condition allows the operation efficiency to be enhanced outstandingly (steps 403 to 405).

The tree displayed in the above-mentioned operation processings, i.e., for example, the object tree, is configured as a structure of a multi-hierarchy including the nodes and the leaves. However, all of the nodes and the leaves are not always displayed. In that case, even if an emergent event has occurred in a leaf not displayed, usually, there exists no measure for informing the user of the occurrence of the emergent event. When the emergent event occurs in the leaf not displayed, an embodiment of the present invention makes it possible to inform the user of the occurrence thereof.

Figure 5:
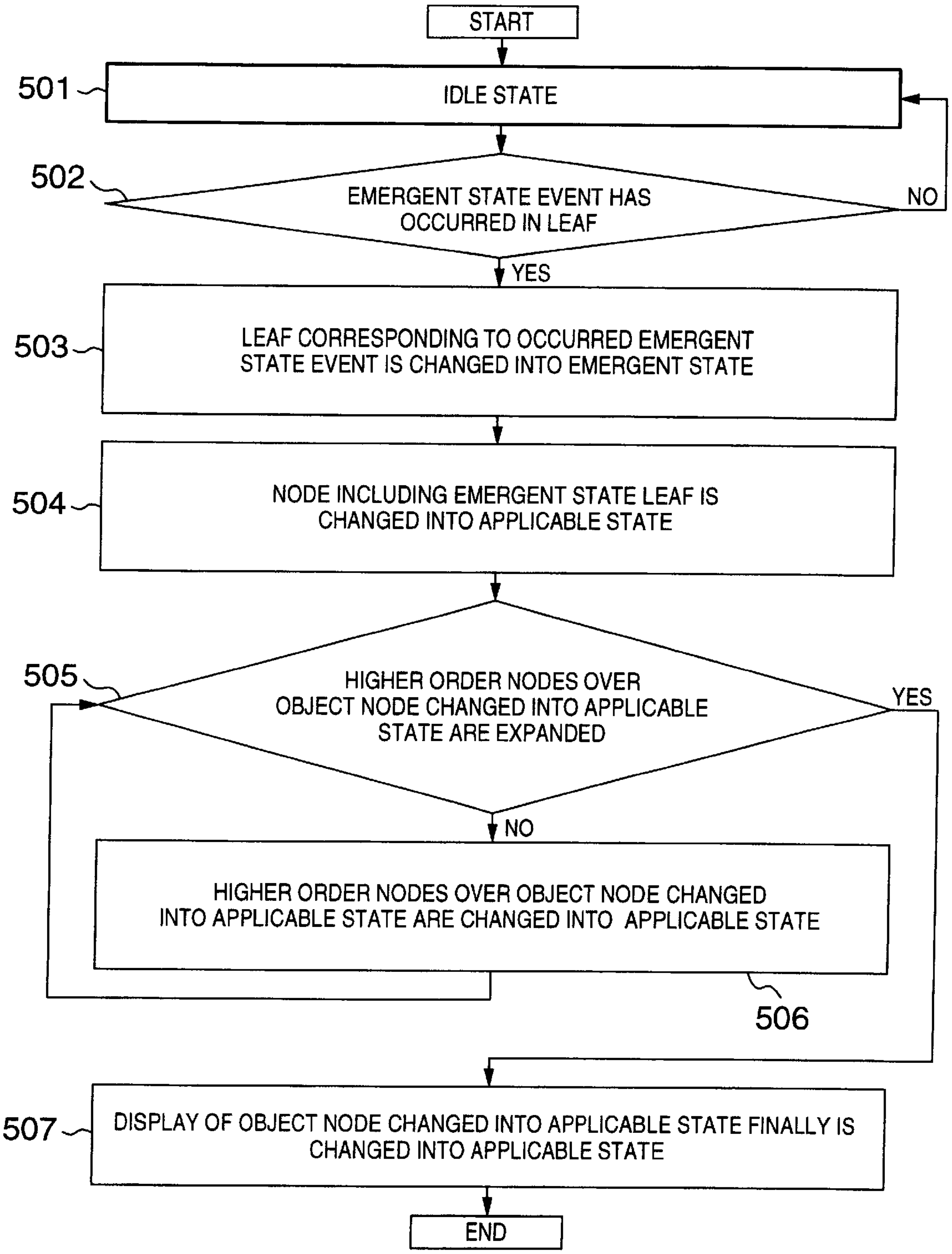
FIG. 5 is a flow chart explaining an inner processing in an information processing apparatus in the case where an emergent event has occurred in a leaf not displayed.

FIG. 5 is a flow chart explaining an inner processing in an information processing apparatus in the case where an emergent event has occurred in a leaf not displayed. Hereinafter, the explanation will be given concerning the flow chart.

(1) It is monitored whether or not an emergent state event has occurred in a leaf in an idle state (steps 501, 502).

(2) If it is detected, at the step 502, that the emergent state event has occurred in the leaf, the leaf corresponding to the emergent state event thus occurred is changed into an emergent state. Also, a node including the leaf in the emergent state is changed into an applicable state, i.e. a state of a node including a leaf in an emergent state (steps 503, 504).

(3) It is judged whether or not higher order nodes over the object node that, at the step 504, has been changed into the applicable state, i.e. the state of the node including the leaf in the emergent state, have been expanded. If such higher order nodes exist, a processing of changing the respective higher order nodes into an applicable state, i.e. a state of a node including a leaf in an emergent state, is repeatedly executed until the expanded higher order nodes vanish (steps 505, 506).

(4) When, at the step 505, the processing of the respective higher order nodes over the object node changed into the applicable state, i.e. the state of the node including the leaf in the emergent state, is terminated and the expanded higher order nodes vanish, and the respective higher order nodes changed into the applicable state, i.e. the state of the node including the leaf in the emergent state, are displayed in a tree-structured display, the display is changed so that it represents an applicable state, i.e. a state of a node including a leaf in an emergent state. This change of the display state is carried out in such a manner that the user can understand it by changing, for example, display configuration, color and so on of an icon attached to a head of the respective node names thus displayed (step 507).

Figure 6:
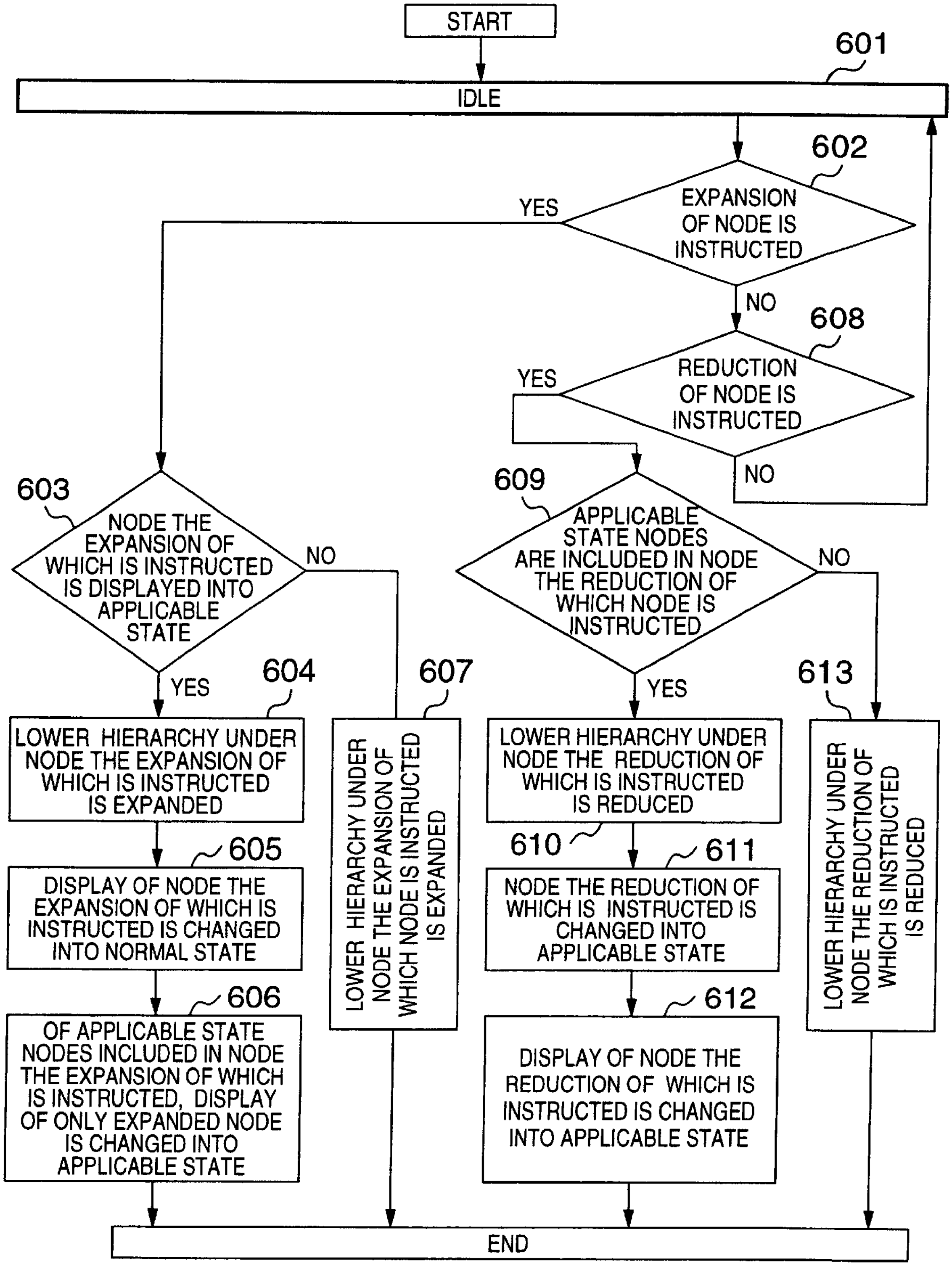
FIG. 6 is a flow chart explaining a processing action in the case where the user performs an operation of expansion/reduction of a tree.

FIG. 6 is a flow chart explaining a processing action in the case where the user performs an operation of the expansion/reduction of a tree. The explanation will be given below concerning the flow chart, referring to the examples of the display pictures.

Figure 35:
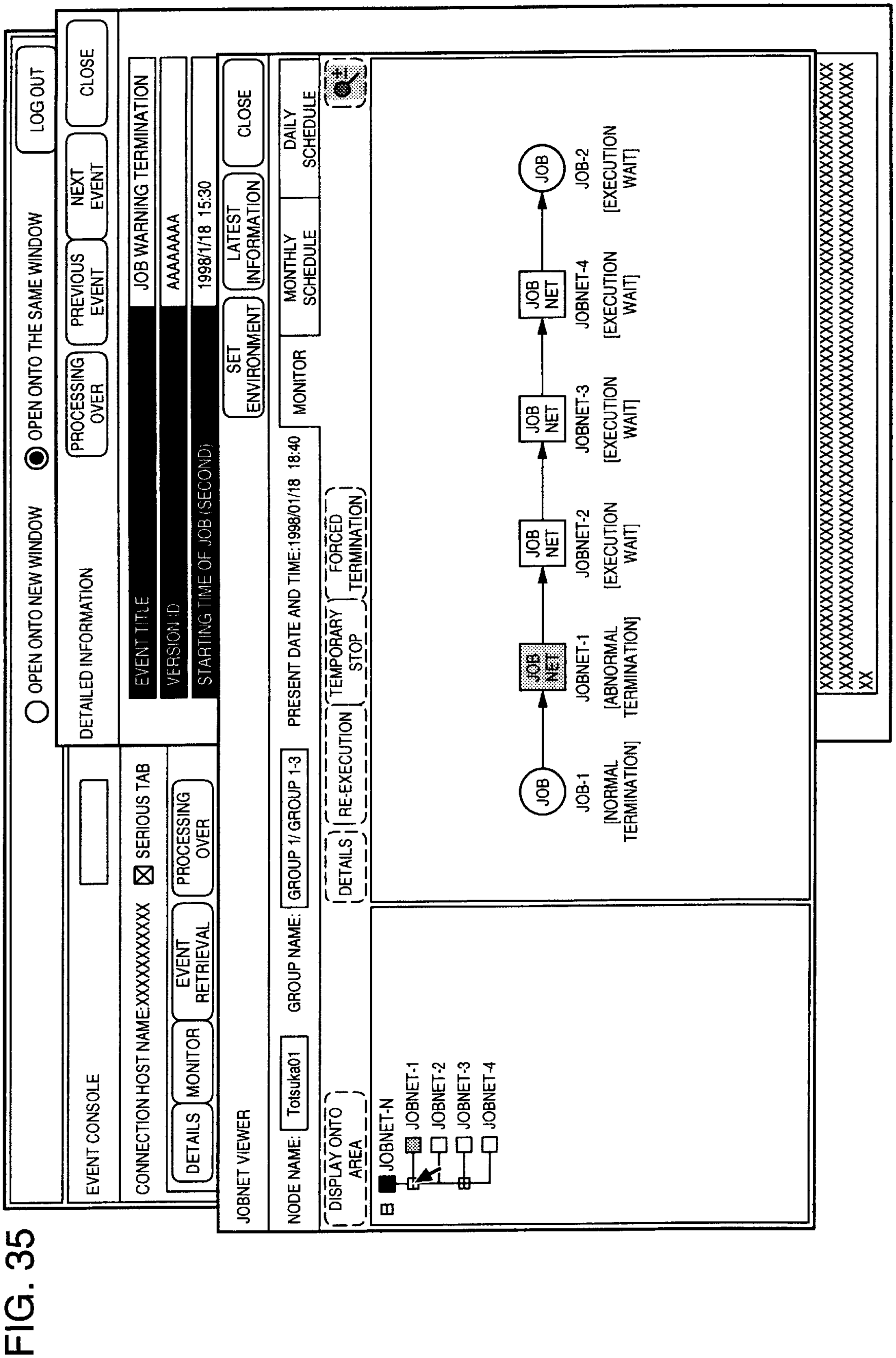
FIG. 35 is a diagram explaining an example of a display picture displayed by an operation processing according to the present invention.

(1) It is assumed that, as an idle state, there is a display picture, for example, illustrated in FIG. 35. This display picture is a picture in which, as described later, "JobNet viewer" is displayed on a new window. Although information displayed on "detailed information" picture is displayed on "JobNet viewer" picture, a tree of JobNet-N and an operation picture of Job are displayed here. Moreover, shading shows that an applicable state, i.e. a state of a node including a leaf in an emergent state occurs in JobNet-1 on the operation picture of Job, JobNet-1 in the tree and JobNet-N, i.e. a higher order node thereover (step 601).

(2) In the display picture illustrated in FIG. 35, it is monitored whether or not the user has instructed to expand a node. If expanding a node, for example, expanding the node JobNet-1, is instructed, it is checked whether or not the node the expansion of which is instructed has been displayed in the applicable state, i.e. the state of the node including the leaf in the emergent state (steps 602, 603).

(3) If it is judged, at the step 603, that the node the expansion of which is instructed has been displayed in the applicable state, i.e. the state of the node including the leaf in the emergent state, a lower order hierarchy under the node the expansion of which is instructed is expanded. Then, display of the nodes thus expanded are changed from the display in the applicable state, i.e. the state of the node including the leaf in the emergent state in the node the expansion of which is instructed, into display in a normal state (steps 604, 605).

(4) Of the expanded nodes under the node the expansion of which is instructed, display of nodes in the applicable state, i.e. the state of the node including the leaf in the emergent state, is changed into the display in the applicable state, i.e. the state of the node including the leaf in the emergent state, thus terminating the processing. As a result, the display of the tree in the display picture illustrated in FIG. 35 is changed into display illustrated in FIG. 36 (step 606).

(5) If it is judged, at the step 603, that the node the expansion of which is instructed has not been displayed in the applicable state, i.e. the state of the node including the leaf in the emergent state, the lower order hierarchy under the node the expansion of which is instructed is expanded, thus terminating the processing (step 607).

(6) At the step 602, if the user has not instructed to expand the node, it is judged whether or not the user has instructed to reduce the node. If not, the display picture in the idle state is kept unchanged (step 608).

(7) In the judgement at the step 608, if the user has instructed to reduce the node, it is checked whether or not the node the reduction of which is instructed has been displayed in the applicable state, i.e. the state of the node including the leaf in the emergent state (step 609).

(8) If it is judged, at the step 609, that the node the reduction of which is instructed has been displayed in the applicable state, i.e. the state of the node including the leaf in the emergent state, a lower order hierarchy under the node the reduction of which is instructed is reduced. Then, the node the reduction of which is instructed is changed into the applicable state, i.e. the state of the node including the leaf in the emergent state (steps 610, 611).

(9) Display of the node the reduction of which is instructed is changed into the display in the applicable state, i.e. the state of the node including the leaf in the emergent state, thus terminating the processing. This processing means returning to the display picture illustrated in FIG. 35 if the display picture illustrated in, for example, FIG. 36 is employed as the idle picture (step 612).

(10) If it is judged, at the step 609, that the node the reduction of which is instructed has not been displayed in the applicable state, i.e. the state of the node including the leaf in the emergent state, the lower order hierarchy under the node the reduction of which is instructed is reduced, thus terminating the processing. This method makes it possible to proceed the processing without missing an emergent event and so on in a leaf not displayed (step 613).

Figure 7:
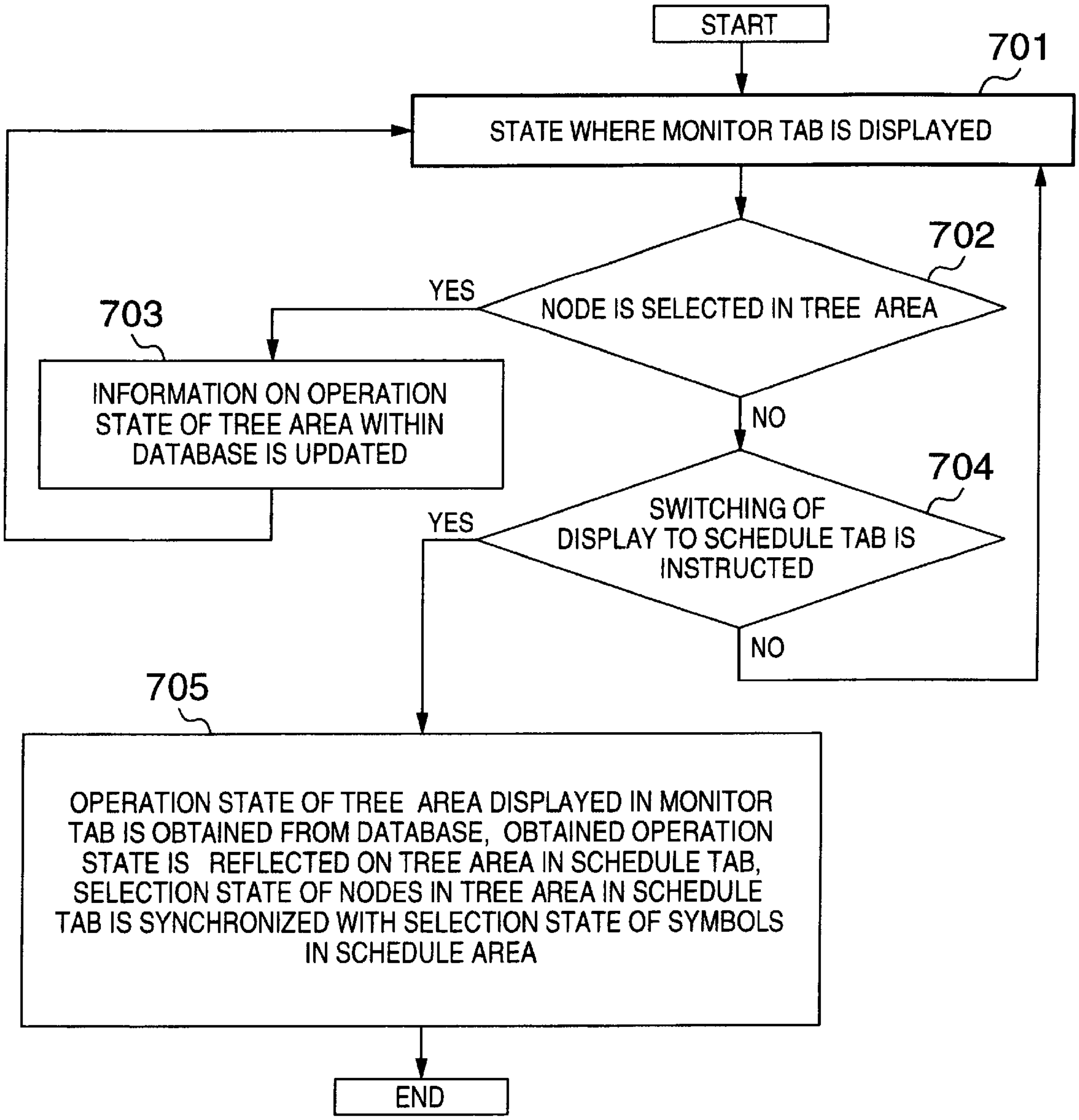
FIG. 7 is a flow chart explaining a processing action for a linkage operation of trees between a plurality of tabs.
Figure 8:
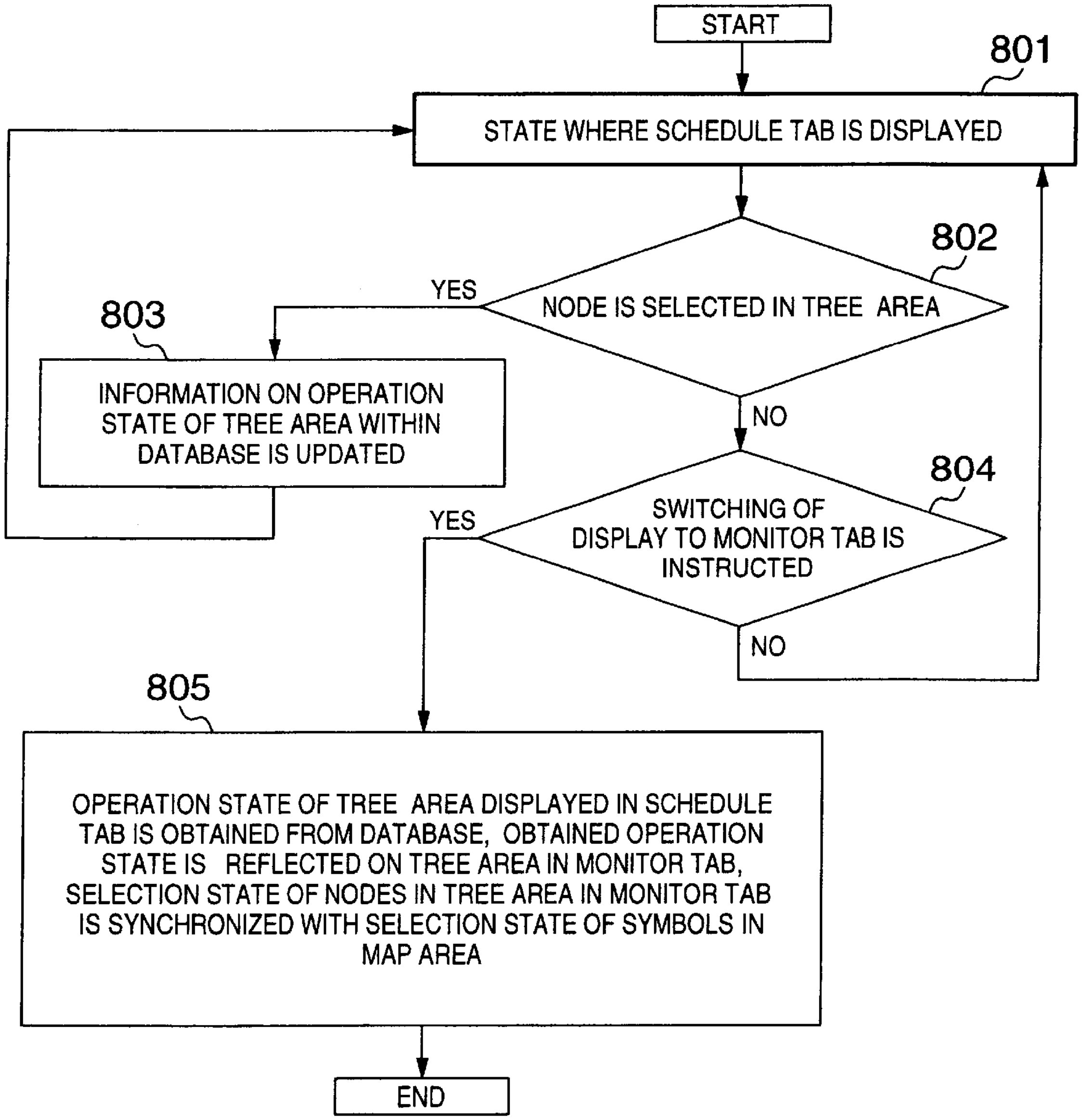
FIG. 8 is a flow chart explaining a processing action for a linkage operation of trees between a plurality of tabs.

FIGS. 7, 8 are flow charts explaining a processing action for a linkage operation of trees between a plurality of tabs. The explanation will be given below concerning the flow chart, referring to the examples of the display pictures.

Figure 36:
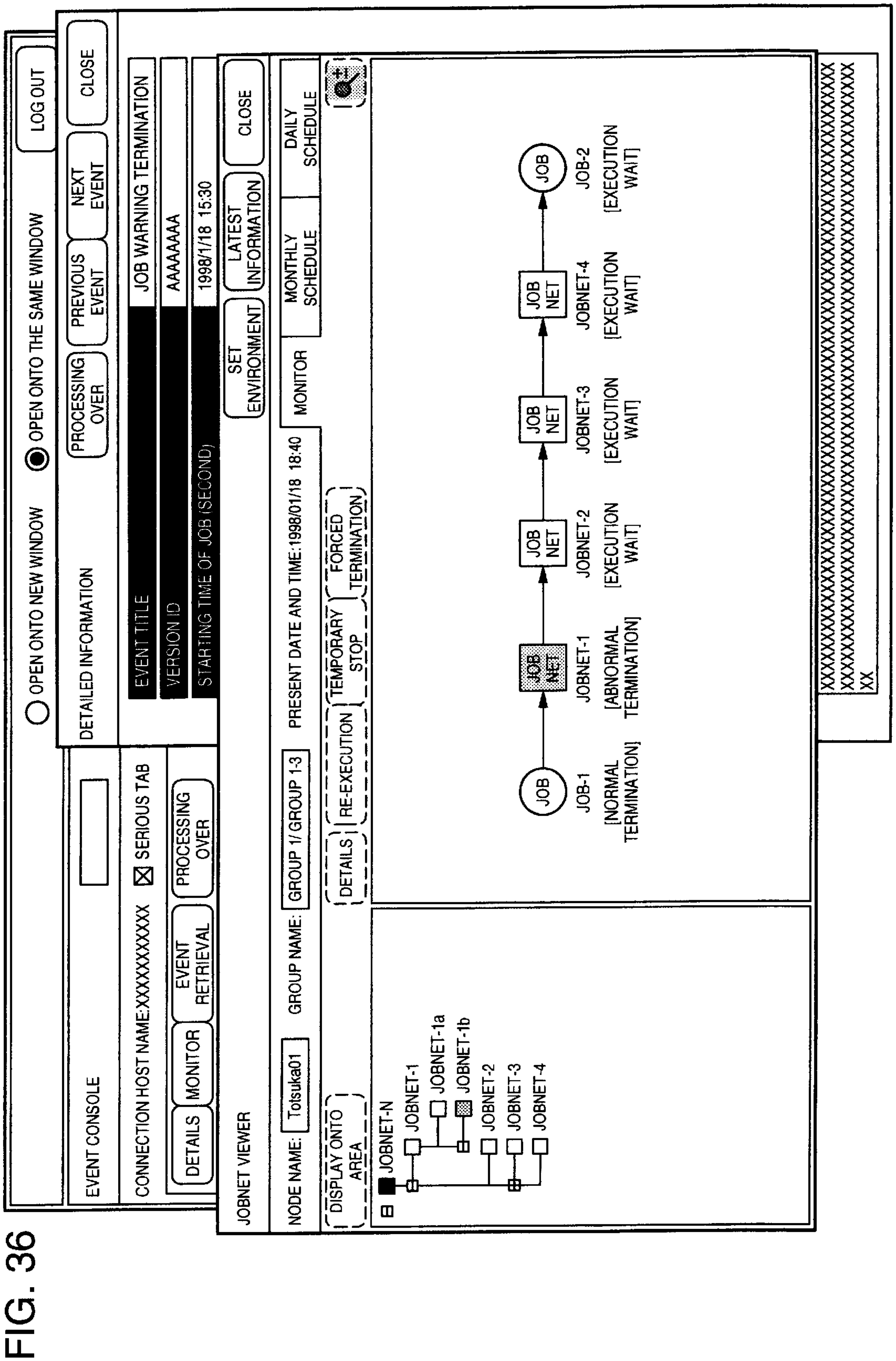
FIG. 36 is a diagram explaining an example of a display picture displayed by an operation processing according to the present invention.
Figure 37:
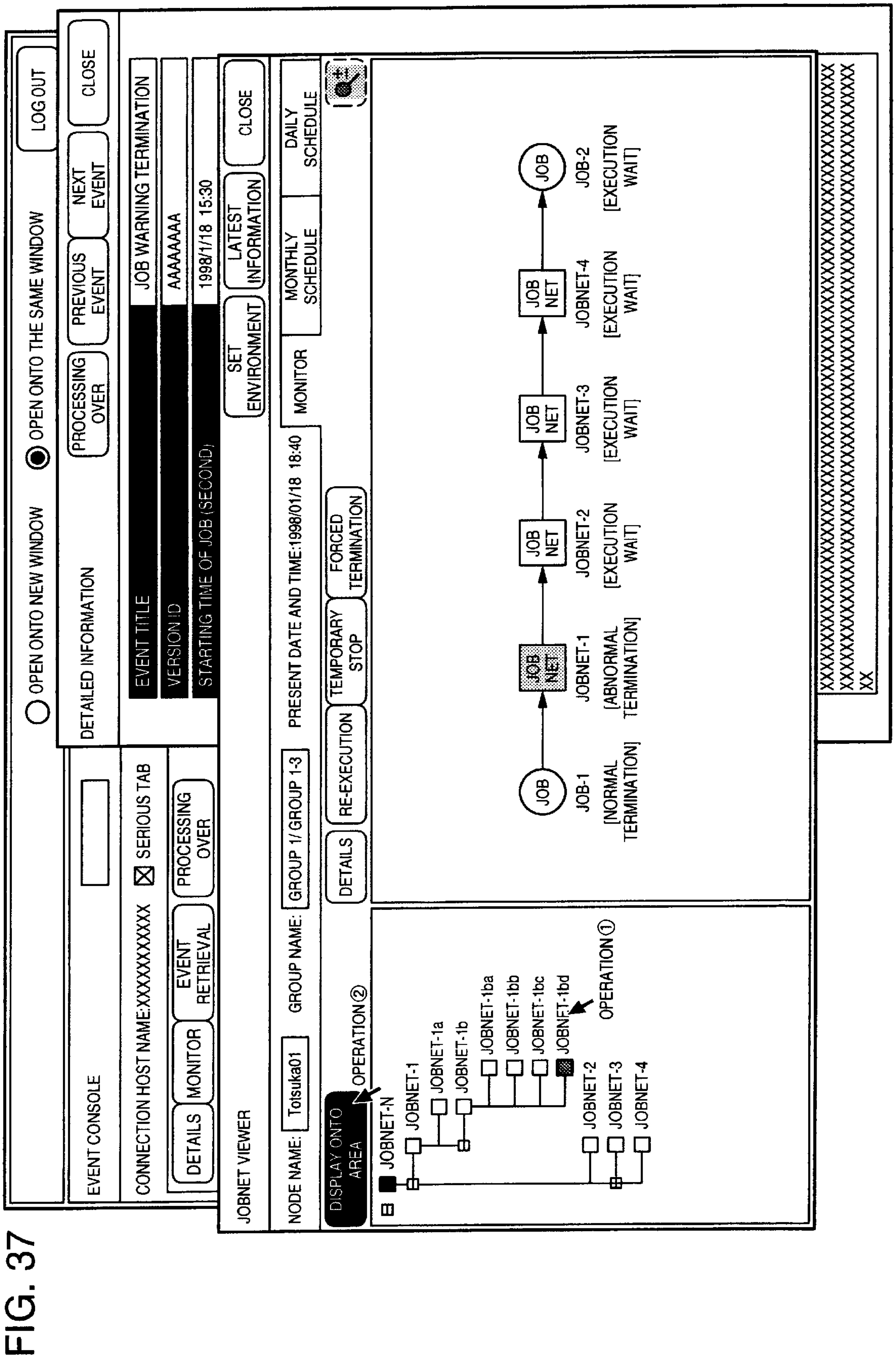
FIG. 37 is a diagram explaining an example of a display picture displayed by an operation processing according to the present invention.

(1) It is assumed that, as a starting picture, there is a display picture illustrated in, for example, FIG. 36 displaying a monitor tab. Let's assume that, in this picture, it is monitored whether or not a node in a tree area has been selected, and a node JobNet-1*b* has been selected. This eventually results in updating of information on an operation state of the tree area within a database, then bringing about a display picture illustrated in FIG. 37 (steps 701 to 703).

(2) If, in the judgement at the step 702, the node in the tree area has not been selected, it is monitored whether or not a display switching to a schedule tab has been instructed. If the display switching to the schedule tab has not been instructed, going back to the step 701, the monitoring is continued (step 704).

Figure 38:
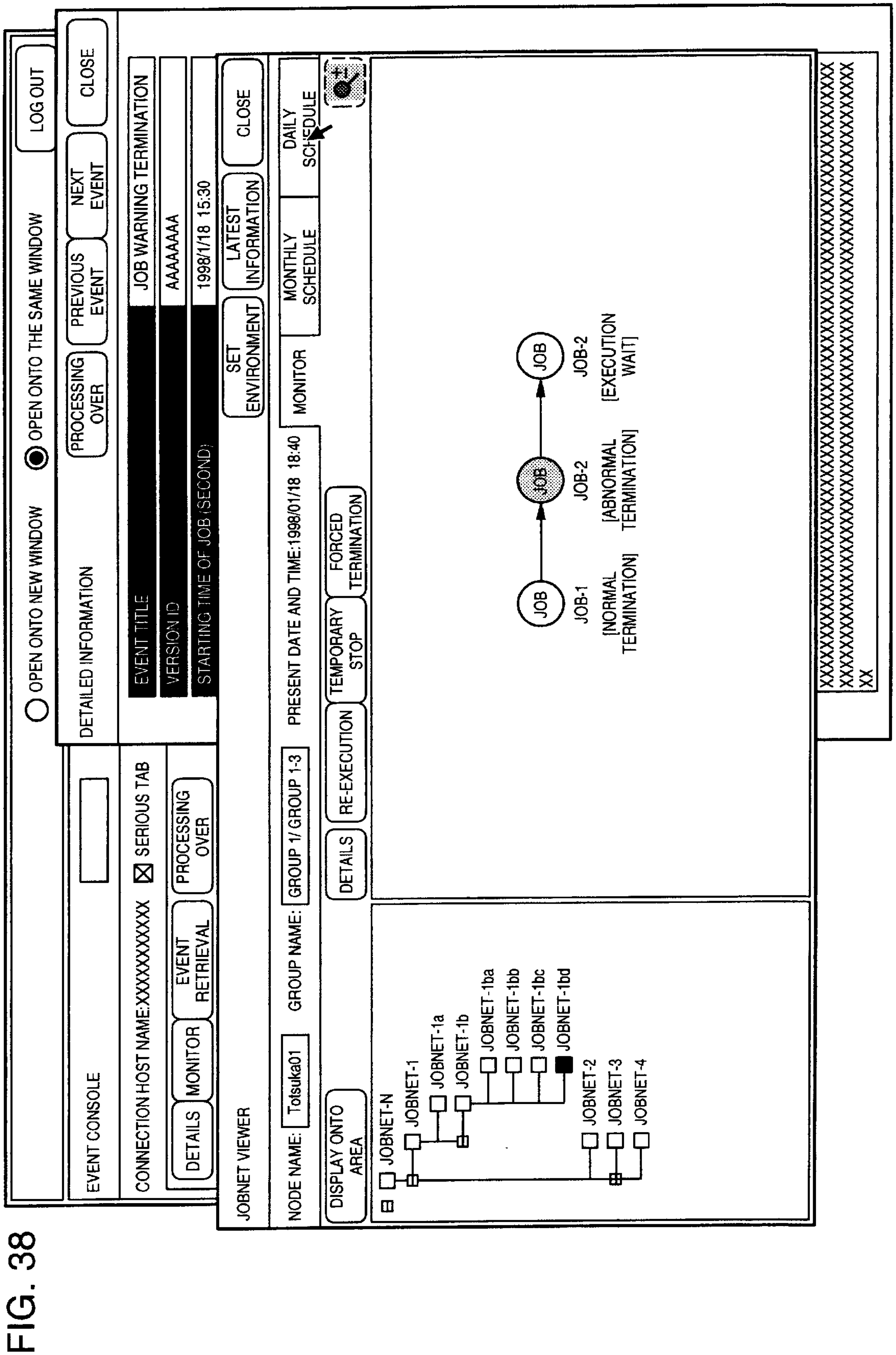
FIG. 38 is a diagram explaining an example of a display picture displayed by an operation processing according to the present invention.
Figure 39:
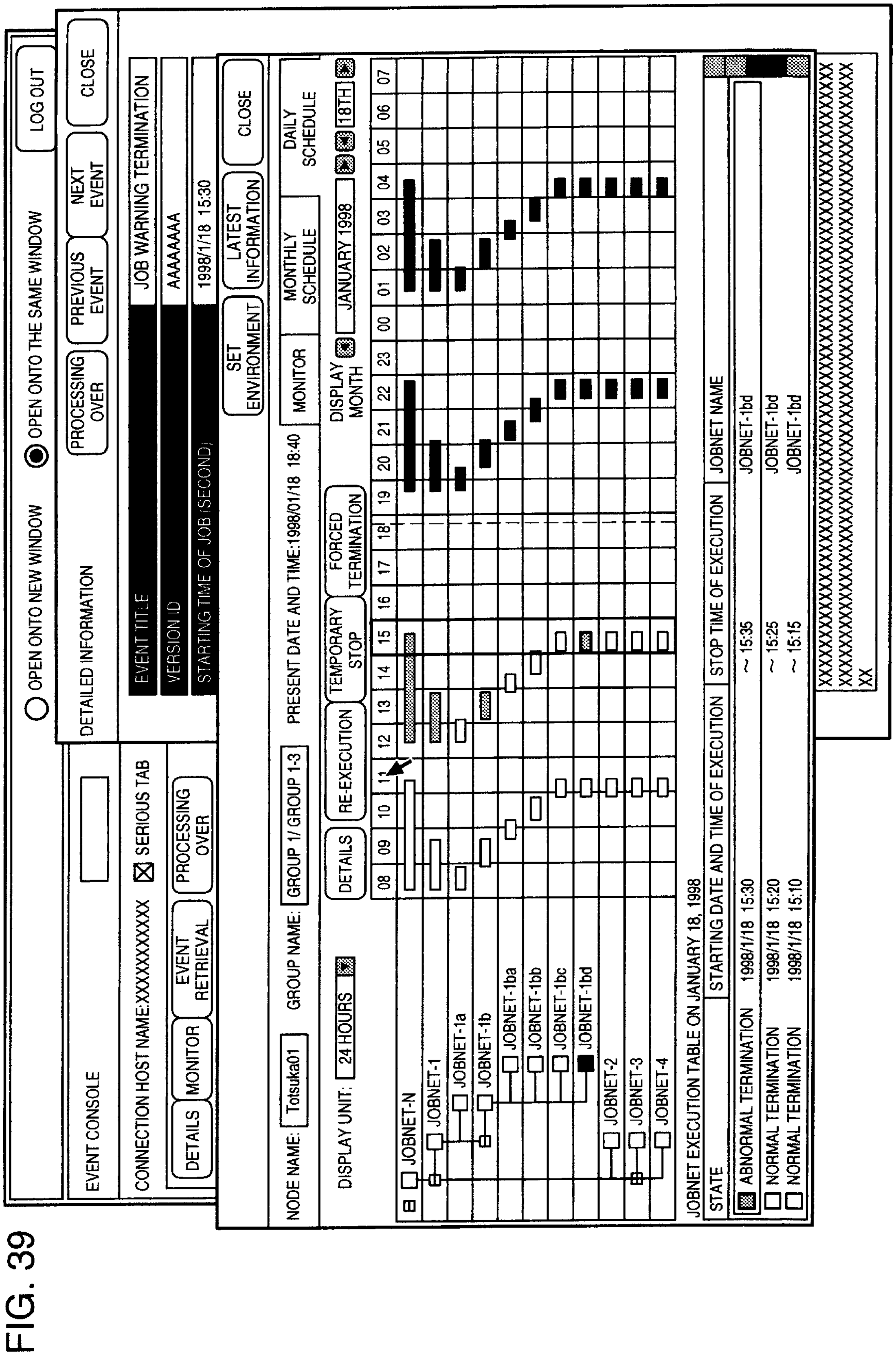
FIG. 39 is a diagram explaining an example of a display picture displayed by an operation processing according to the present invention.

(3) If, at the step 704, as indicated by an arrow in FIG. 38, the selection of the schedule tab, in this case, a tab of daily schedule, is instructed, the operation state of the tree area displayed in the monitor tab is obtained from the database, and the operation state obtained is caused to reflect on the tree area in the schedule tab. Moreover, selection state of nodes in the tree area in the schedule tab is synchronized with selection state of symbols in the schedule area. As a result, a daily schedule illustrated in FIG. 39 is displayed in such a manner that it is made to correspond to the nodes displayed in the tree area. As described above, the operation state in the monitor tab is synchronized with the operation state in the schedule tab, and the selection state of nodes in the tree area in the schedule tab is synchronized with the selection state of the symbols in the schedule area. This allows the operator to clearly recognize the operation states and the selection states, thus making it possible to enhance the operation efficiency (step 705).

(4) If, at the step 705, in the state where the daily schedule illustrated in FIG. 39 is displayed, it is monitored whether or not the node in the tree area has been selected and one node has been selected, the information on the operation state of the tree area within the database is updated (steps 801 to 803).

(5) If, in the judgement at the step 802, the node in the tree area has not been selected, it is monitored whether or not a display switching to the monitor tab has been instructed. If the display switching to the monitor tab has not been instructed, going back to the step 801, the monitoring is continued (step 804).

Figure 40:
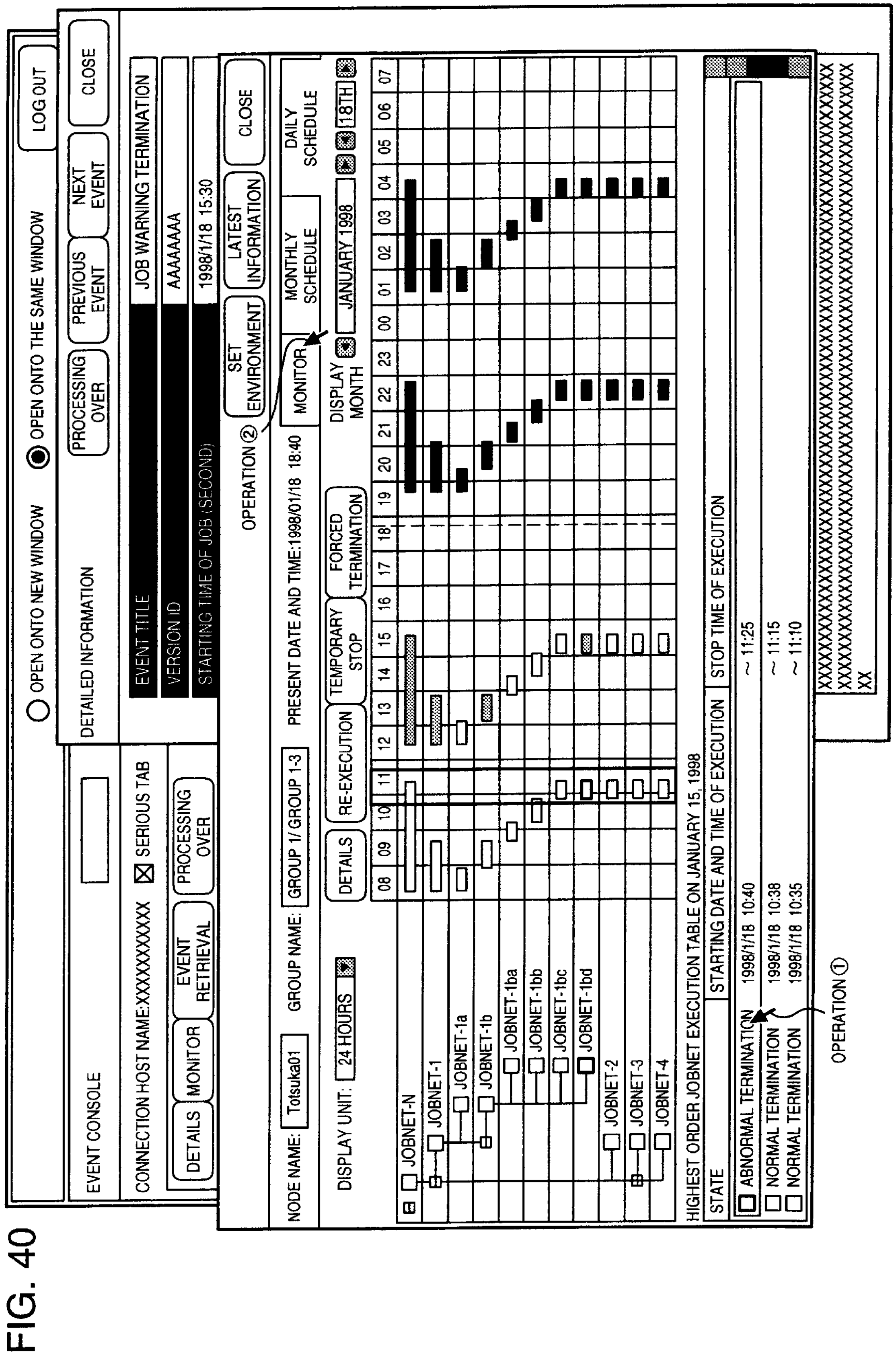
FIG. 40 is a diagram explaining an example of a display picture displayed by an operation processing according to the present invention.
Figure 41:
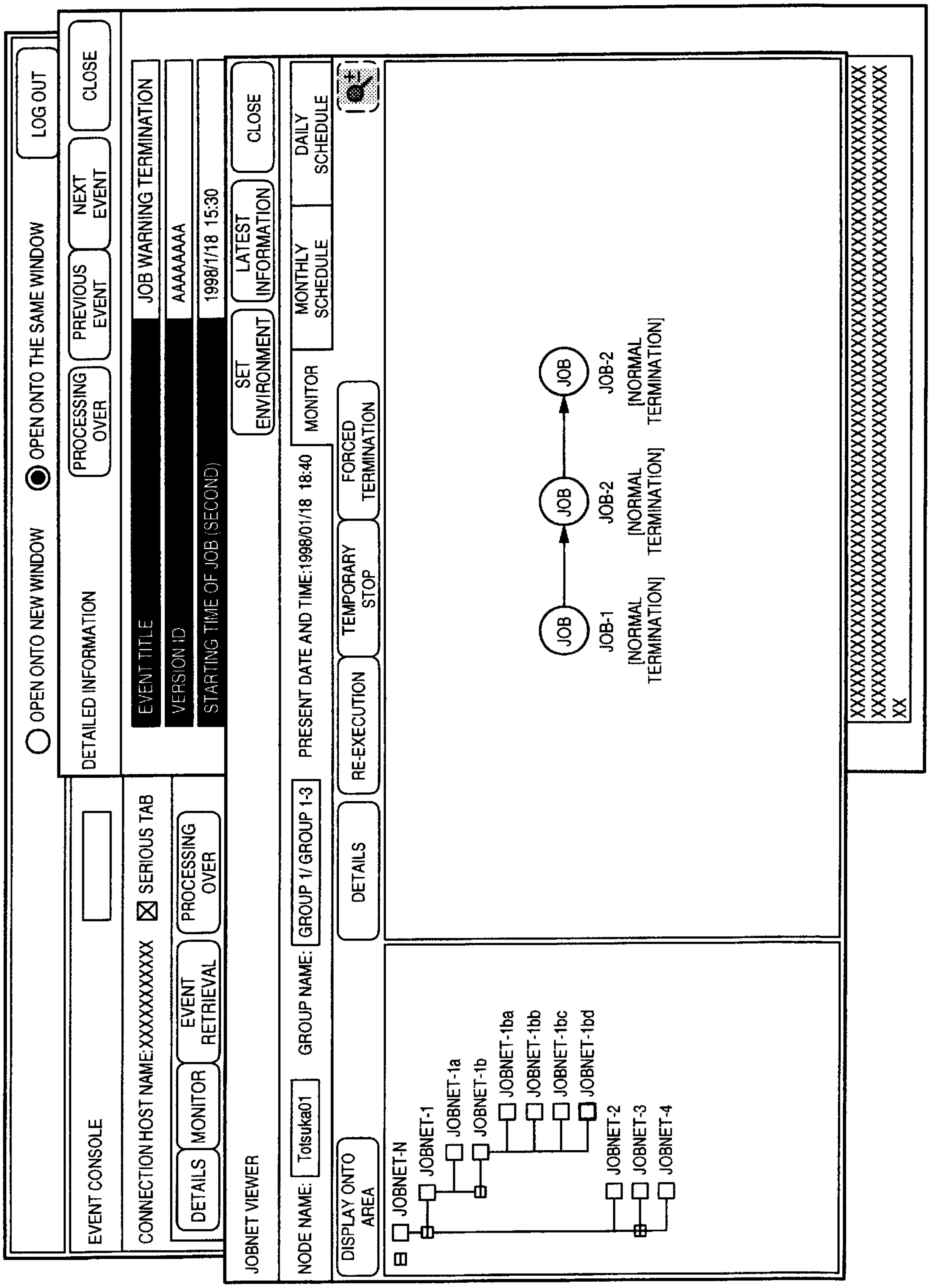
FIG. 41 is a diagram explaining an example of a display picture displayed by an operation processing according to the present invention.

(6) If, at the step 804, as indicated by an arrow in FIG. 40, the display switching to the monitor tab has been instructed, an operation state of the tree area displayed in the schedule tab is obtained from the database, and the operation state obtained is caused to reflect on the tree area in the monitor tab. Moreover, selection state of nodes in the tree area in the monitor tab is synchronized with selection state of symbols in a map area. As a result, it becomes possible to obtain a display picture illustrated in FIG. 41. This allows the operator to clearly recognize the operation states and the selection states, thus making it possible to enhance the operation efficiency (step 805).

Since, in displaying the schedule explained using FIGS. 7, 8, the schedule over all the time slots in a day is displayed, it is impossible to recognize state of the details.

Figure 9:
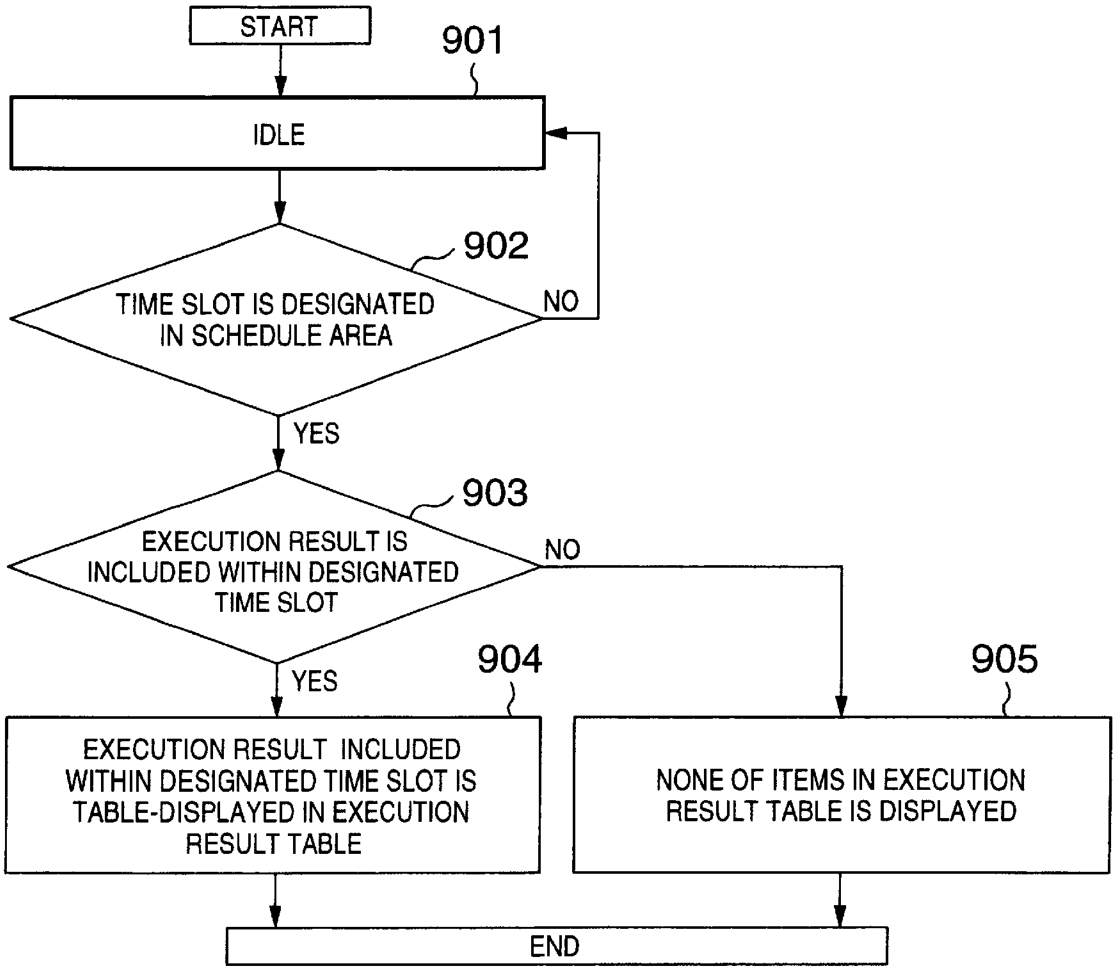
FIG. 9 is a flow chart explaining a processing action in the case where a time slot is designated and an execution result included within the time slot is displayed on another window.

FIG. 9 is a flow chart explaining a processing action in the case where a time slot is designated and an execution result included within the time slot is displayed on another window. The explanation will be given below concerning the flow chart.

(1) It is assumed that, as an idle state, there is displayed the daily schedule illustrated in FIG. 39. In the display picture illustrated in FIG. 39, a time slot 15 o'clock, by being surrounded with a heavy line, has been already selected. Execution result of JobNet 1-*bd* included within the selected time slot and selected in the tree is displayed as a JobNet execution table. Furthermore, this example shows that execution of JobNet 1-*bd* from 15:30 to 15:35 has been terminated abnormally (step 901).

(2) If, in such a schedule display area in the display picture, it is monitored whether or not a time slot has been designated and, as indicated by an arrow, if a time slot 11 o'clock is designated, it is judged whether or not the execution result is included within the designated time slot (steps 902, 903).

(3) If, in the judgement at the step 903, the execution result is included within the designated time slot, the execution result is table-displayed in an execution result table. If not, none of the items in the execution result table is displayed. When the execution result is included within the designated time slot, it is possible to obtain a display picture as illustrated in FIG. 40 and thus to table-display the execution result at the time slot 11 o'clock. This, even when a lot of execution results are concentrated in a schedule area within a fixed period of time, makes it possible to know details of the execution result and, in the schedule area, to provide an easy-to-see display without displaying excessive information (steps 904, 905).

Figure 10:
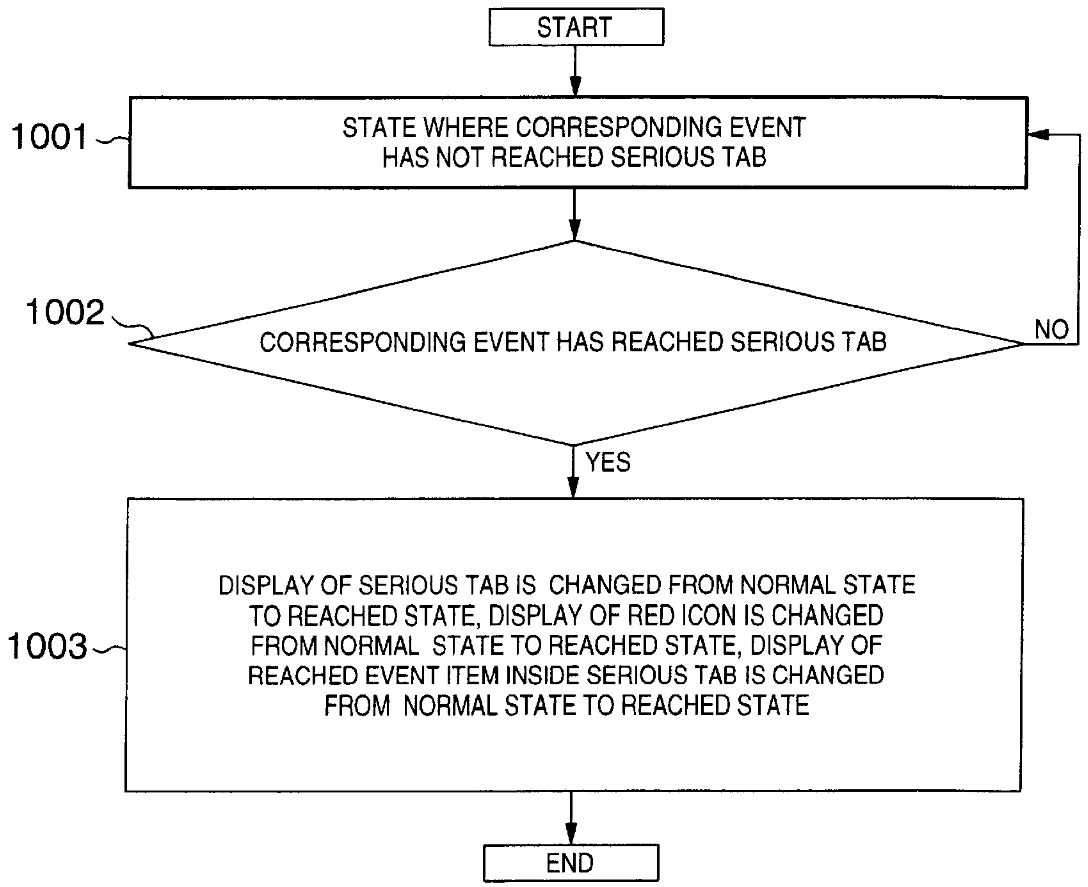
FIG. 10 is a flow chart explaining a processing for informing the user of an event that has occurred in a hidden tab.
Figure 11:
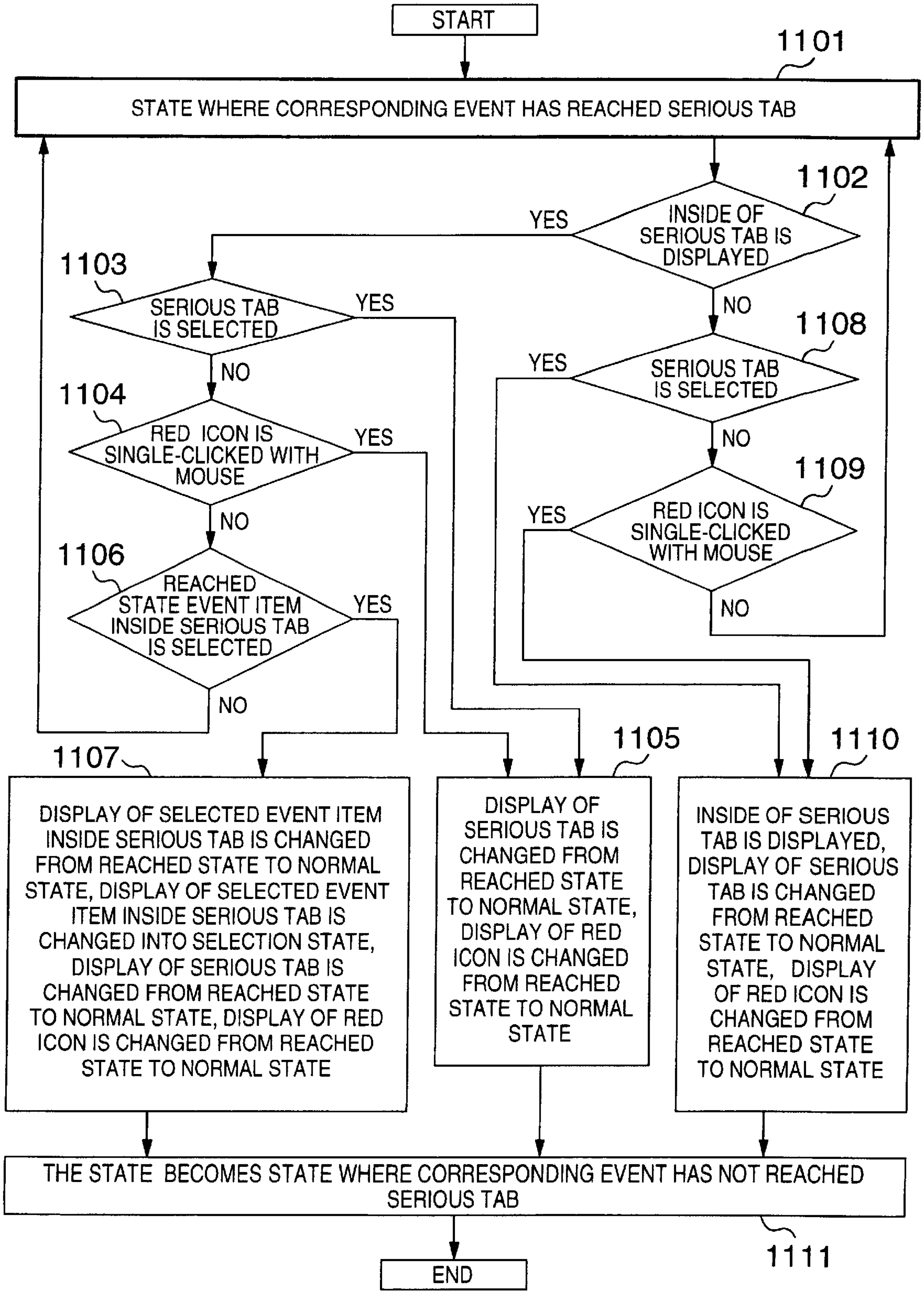
FIG. 11 is a flow chart explaining a processing for informing the user of an event that has occurred in a hidden tab.

FIGS. 10, 11 are flow charts explaining a processing for informing the user of an event that has occurred in a hidden tab.

Incidentally, in the following explanation, a case where an event has not reached means a case where a new event toward which the confirmation operation by the user has not been performed does not exist, and a state where an event has reached means a state where the new event toward which the confirmation operation by the user has not been performed exists.

(1) Now, as a display picture displaying a state where a corresponding event has not reached Serious tab, let's start with a display picture illustrated in FIG. 30. In this display picture, the user has clicked on a check box 33 of "Make contact at the time when a new event reaches Serious tab". This operation switches the information processing apparatus to a mode of making contact at the time when a new event reaches the Serious tab (step 1001).

(2) The information processing apparatus monitors whether or not an event has reached the Serious tab. If the event has reached the tab, the information processing apparatus switches the Serious tab from a normal state to a reached state. This switching of display, as illustrated in FIG. 31, switches display of the Serious tab 31 from the normal state to a void display, and also switches display of a red icon 32 of an event console from a normal state to a reached state. Moreover, although not illustrated in FIG. 31, the information processing apparatus switches display of items on reached events inside the Serious tab from a normal state to a reached state (steps 1002, 1003).

(3) When, at the above-mentioned step 1003, the user recognizes that the event has reached the Serious tab by seeing the switched display picture illustrated in FIG. 31, he or she confirms whether or not the present display picture displays the inside of the Serious tab. This is needed because, although the inside of the Serious tab is not displayed in the example in FIG. 31, this processing is sometimes started from a state where the inside of the Serious tab is displayed (steps 1101, 1102).

(4) If, at the step 1102, the inside of the Serious tab is displayed and the user selects the Serious tab or the red icon, the information processing apparatus, judging that the user has confirmed that the event had reached the Serious tab, changes the display of the Serious tab from the reached state to the normal state, and changes the display of the red icon from the reached state to the normal state (steps 1103 to 1105).

(5) Also, if the user selects neither the Serious tab nor the red icon but selects an event item in the reached state inside the Serious tab, the information processing apparatus changes display of the reached state of the selected event item inside the Serious tab to display in the normal state, and changes display of this item to display in a selection state. Furthermore, the information processing apparatus changes the display of the Serious tab from the reached state to the normal state, and changes the display of the red icon from the reached state to the normal state. This state is displayed as a display picture illustrated in, for example, FIG. 33. Although not directly concerned with the processing explained here, in the display picture illustrated in FIG. 33, selecting an event item (: operation ①) and then selecting a command button "Details" (: operation ②), as illustrated in a display picture in FIG. 34, allows details of the event to be displayed (steps 1106, 1107).

(6) If, at the step 1102, the inside of the Serious tab is not displayed and the user selects the Serious tab or the red icon (: operation ② or ①), the information processing apparatus, as illustrated in the display picture in FIG. 32, displays the inside of the Serious tab and at the same time, changes the display of the Serious tab from the reached state to the normal state and changes the display of the red icon from the reached state to the normal state. Additionally, also here, selection of an event item inside of the Serious tab enables details of the event to be displayed (steps 1108 to 1110).

(7) The termination of the processings at the steps 1105, 1107 and 1110 changes the display picture to the state where the corresponding event has not reached the Serious tab. This makes it possible for the operator to easily recognize that an event has reached the inside of a tab not displayed. Also, the reached event that the operator had once confirmed goes back to the normal state. This makes it possible to securely recognize a reached event that has not been confirmed at the instant (step 1111).

In the display in the information processing apparatus, usually, a request is made that a new picture should be opened from a state where another picture has been already displayed. The request in that case is classified into a case where the new picture is opened on a new window and a case where the new picture is opened on one and the same window.

Figure 12:
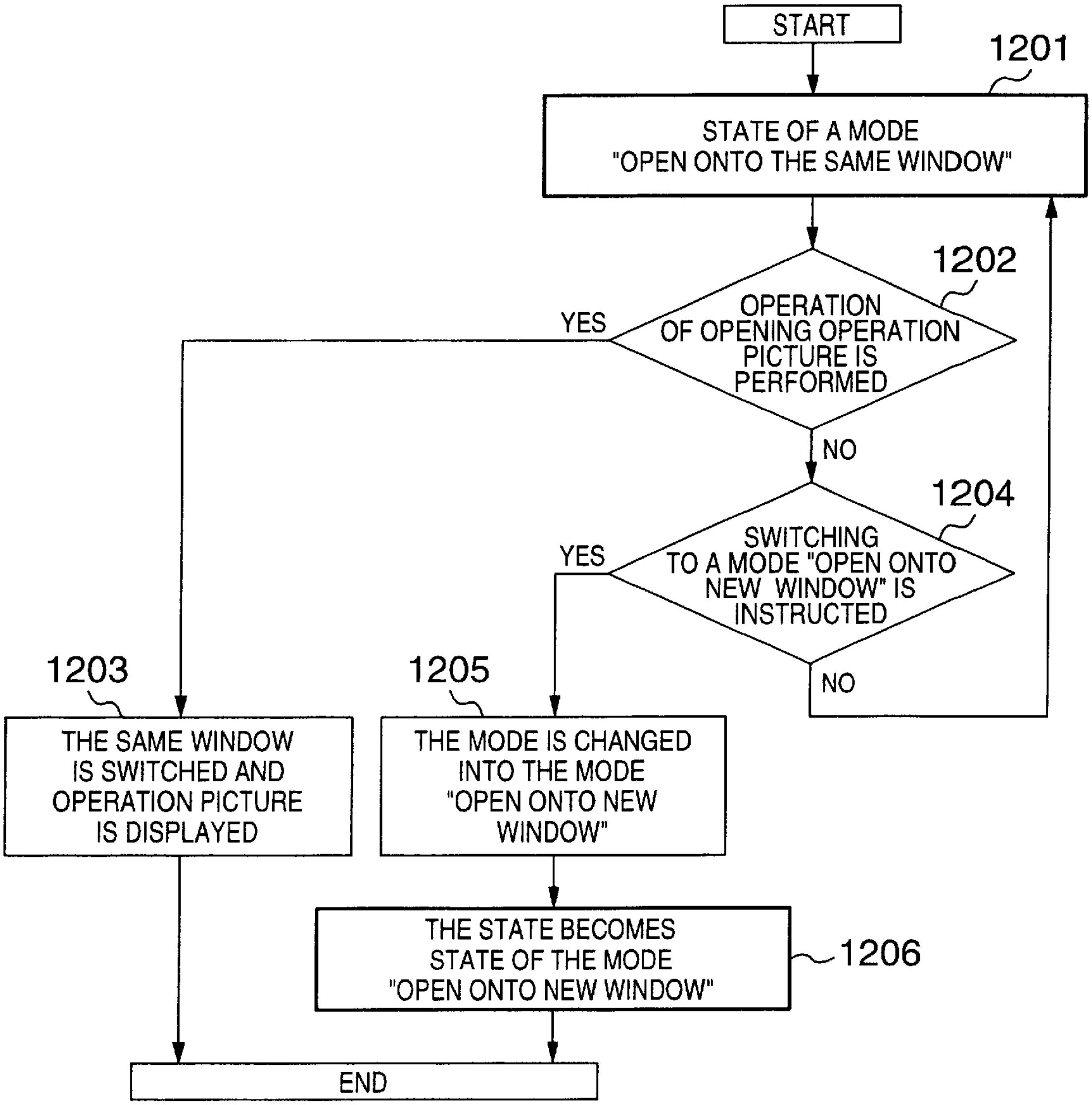
FIG. 12 is a flow chart explaining a processing in the case where, from a state in which a picture is displayed, a new picture is opened on one and the same window.
Figure 13:
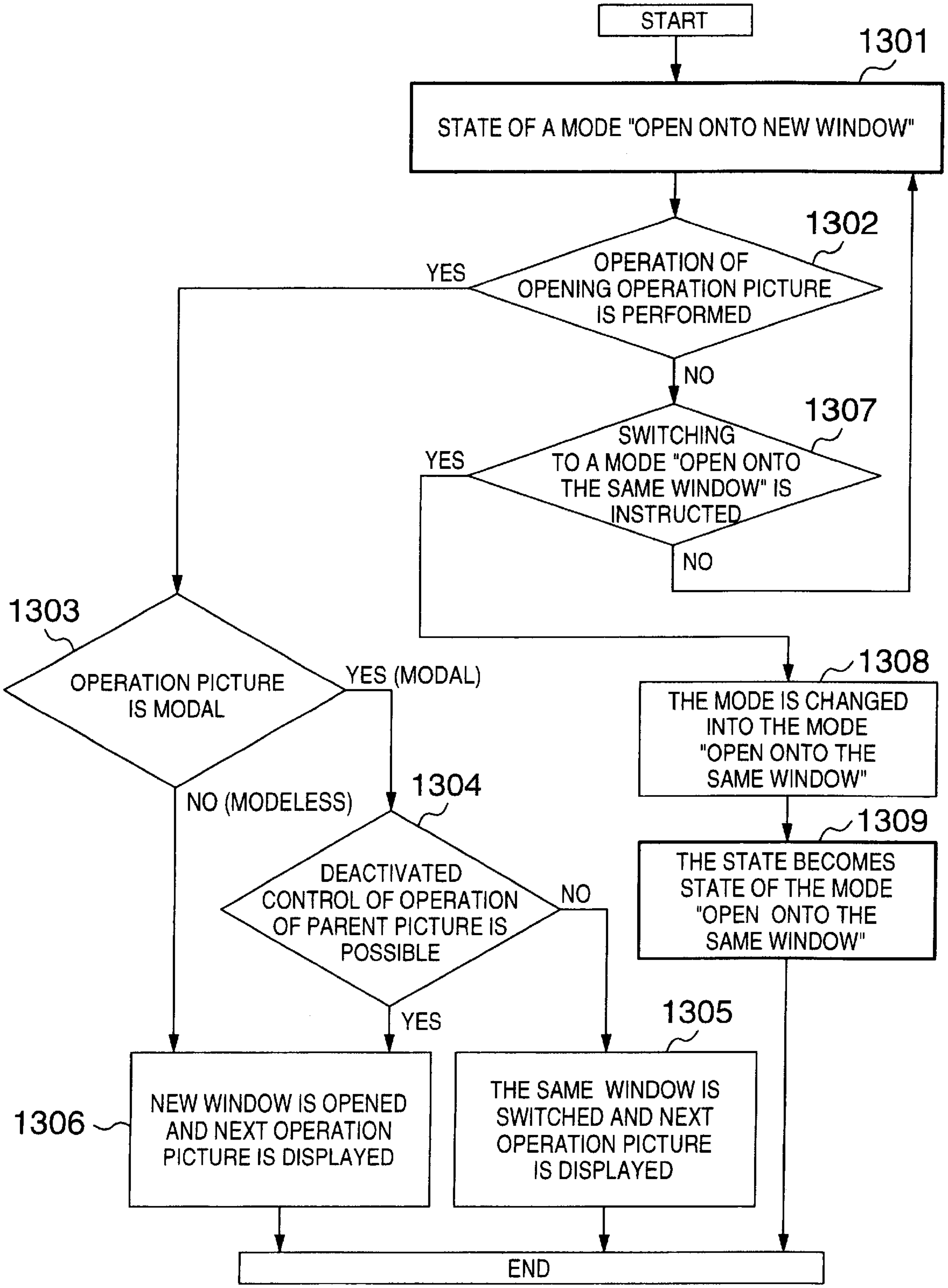
FIG. 13 is a flow chart explaining a processing in the case where, from a state in which a picture is displayed, a new picture is opened on a new window.

FIGS. 12, 13 are flow charts explaining a processing in the case where, from the state where a picture has been already displayed, a new picture is opened.

First, referring to the flow chart illustrated in FIG. 12, the explanation will be given below concerning the case where a new picture is opened on one and the same window.

(1) Now, concerning a state where the display picture illustrated in FIG. 25 is displayed, it is assumed that the state is set to be a mode of opening a new picture on the same window. This display picture illustrates a state where, by the processing with the object task, one node within the object tree has been selected and the list thereof is displayed (step 1201).

(2) In the display picture illustrated in FIG. 25, if the user selects one Job name within the list (: operation ①) and selects a command button, "Refer to definition" (: operation ②), as illustrated in FIG. 26, the same window is switched and there is displayed a picture where information on the selected JobNet is displayed (steps 1202, 1203).

Figure 27:
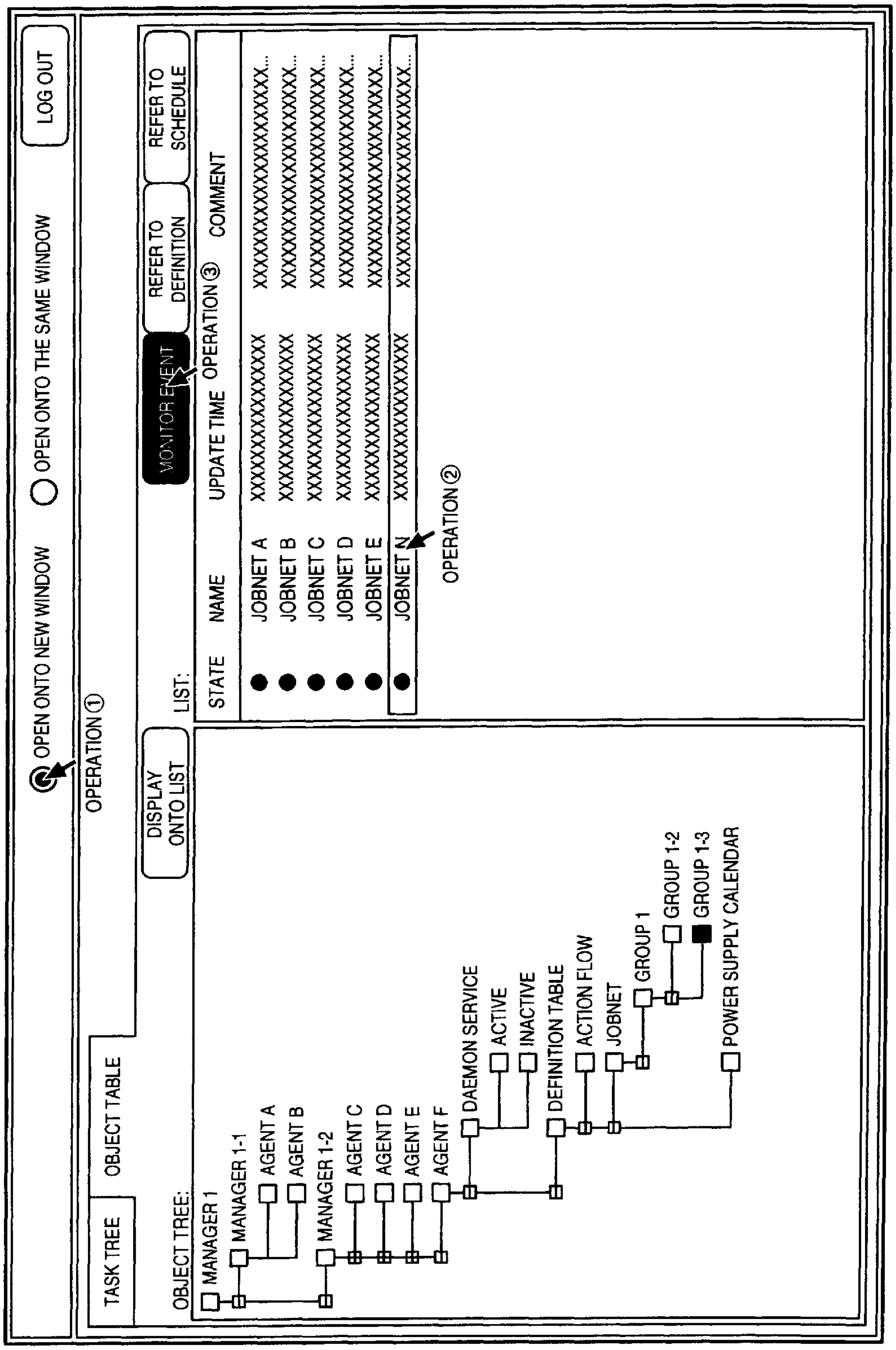
FIG. 27 is a diagram explaining an example of a display picture displayed by an operation processing according to the present invention.

(3) If the operation at the step 1202 has not been performed and, as illustrated in FIG. 27, switching to a mode of opening a new picture on a new window is instructed (: operation ②), the display picture is changed into a mode "Open onto new window". Accordingly, the state becomes the mode "Open onto new window", which makes it possible to start a processing illustrated in FIG. 13. As described above, it is possible to select between the mode of opening on a new window and the mode of opening on the same window. This allows the operator to display a window in a form suitable for a picture that he or she wishes to display (steps 1204 to 1206).

Next, referring to the flow chart illustrated in FIG. 13, the explanation will be given below concerning the case where a new picture is opened on a new window.

(1) In the state where, by the above-mentioned processing at the step 1206 and as illustrated in FIG. 27, the display picture is changed into the mode of opening on a new window, if the user selects one Job name within the list (: operation ②) and selects a command button, "Monitor event"(: operation ③), it is checked whether or not the operation picture is modal (steps 1301 to 1303).

(2) If, at the step 1303, the operation picture is judged to be modal, it is judged whether or not a deactivated control of operation of a parent picture is possible. If it is judged that the deactivated control of operation of the parent picture is impossible, the same window is switched and there is displayed a next operation picture. This is intended for preventing a possibility that, when the new picture is opened on a new window, a false operation of the parent picture may be committed because the deactivated control of operation of the parent picture is impossible. An example of the display picture in this case turns out to be the display picture illustrated in, for example, FIG. 26, which is a display picture that is obtained by selecting a command button, "Refer to definition" at the step 1303. Accordingly, the display by the switching of the same window prevents the operator from committing the false operation of the parent picture, thus making it possible to enhance the operation efficiency. Moreover, if the operator operates the operation picture without recognizing whether or not the operation picture is modal, the display by the switching of the same window also brings about an effect of causing the operator to recognize that the operation picture is modal (steps 1304, 1305).

Figure 28:
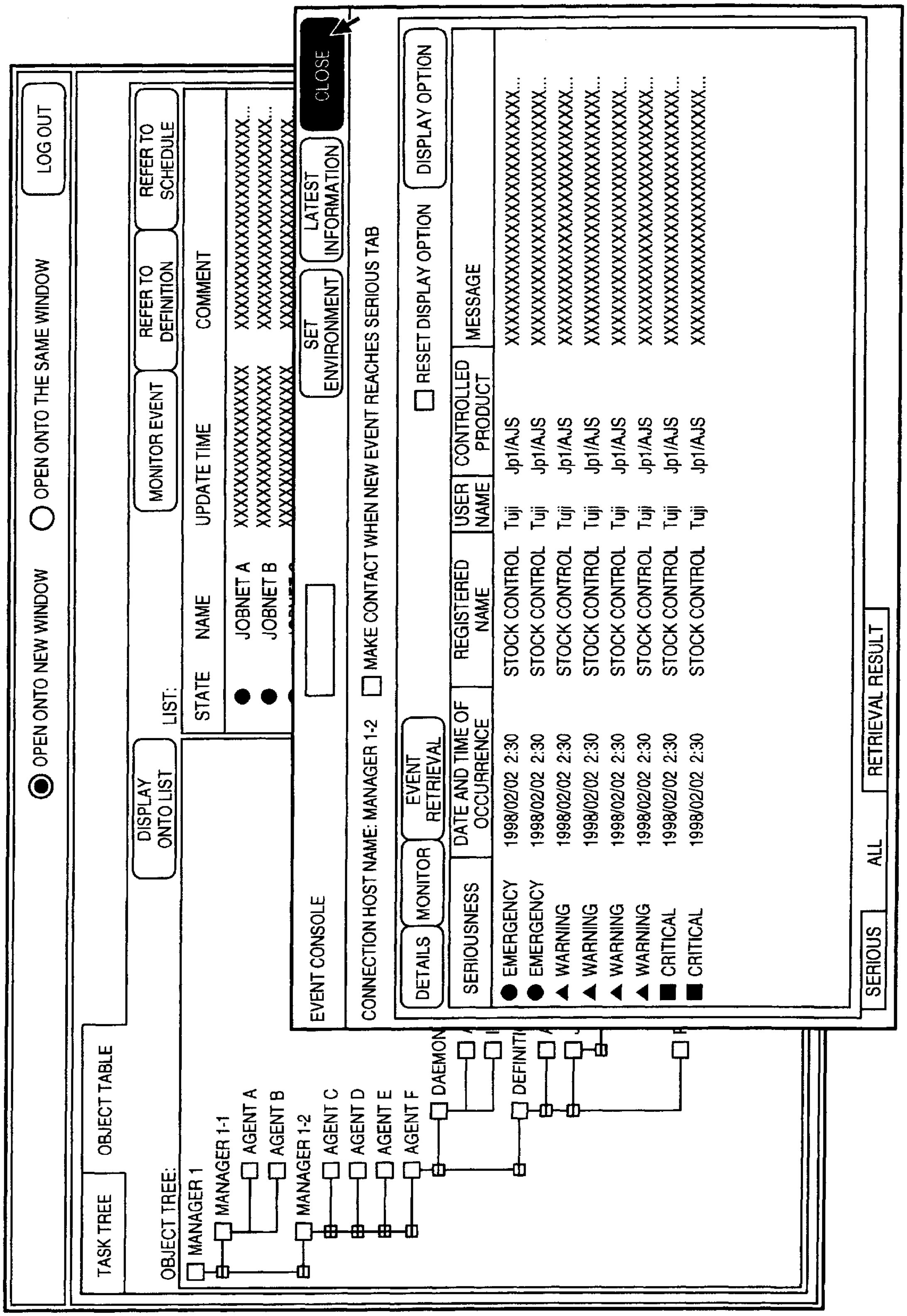
FIG. 28 is a diagram explaining an example of a display picture displayed by an operation processing according to the present invention.

(3) If, at the step 1303, the operation picture is judged to be not modal, i.e. modeless, and, at the step 1304, it is judged that the deactivated control of operation of the parent picture is possible, as illustrated in a display picture in FIG. 28, a new window is opened and there is displayed a next operation picture (step 1306).

Figure 29:
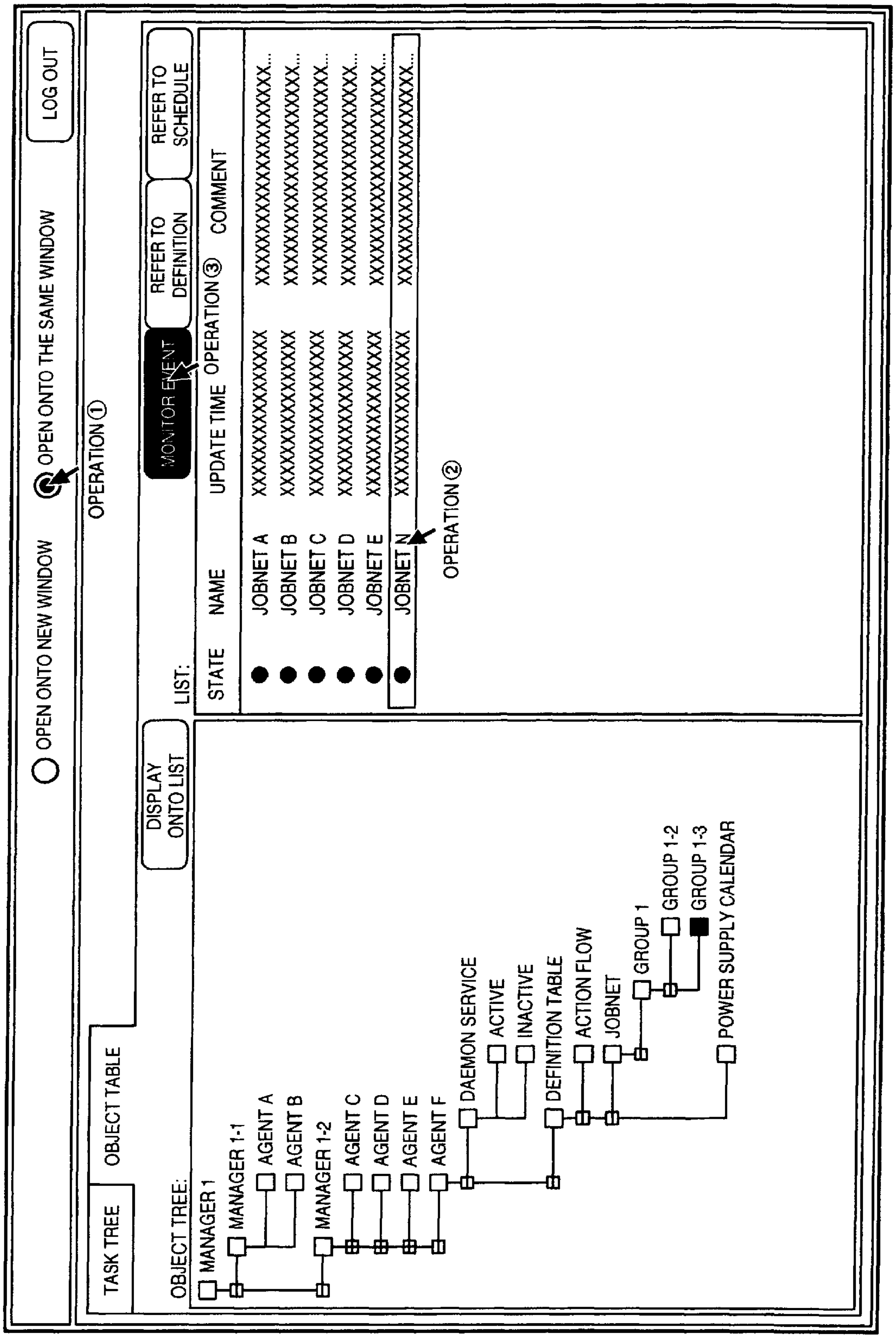
FIG. 29 is a diagram explaining an example of a display picture displayed by an operation processing according to the present invention.

(4) If the operation at the step 1302 has not been performed and, as illustrated in FIG. 29, switching to the mode of opening a new picture on the same window is instructed (: operation ①), the display picture is changed into a mode "Open onto the same window". Accordingly, the state becomes the mode "Open onto the same window". This makes it possible to start the processing illustrated in FIG. 12 (steps 1307 to 1309).

As described above, the present invention makes the following processings possible: Executing the operation from either of the two approaches, i.e. the processing oriented toward an object to be processed or the processing oriented toward a task to be processed, and dealing with effectively a lot of tasks and various types of objects, and achieving a flexible operation.

Also, the present invention decreases operation mistakes such as the selection of a command that is against an intention of the user, thereby making it possible to prevent a waiting time due to the operation mistakes from occurring.

Also, the present invention makes the following processings possible: Displaying states such as an emergency state of a leaf node hidden under a higher order node when a displaying is executed using an expandable/reducible tree having a hierarchical structure, and impressing on the user a situation that one object is being displayed from a variety of viewpoints even when a plurality of pictures are displayed in parallel at a time.

Also, even when a lot of execution results are concentrated in the schedule area within a fixed period of time, the present invention prevents symbols representing the execution results from being physically overlapped with each other, thereby making it possible to arbitrarily identify the symbols within the schedule area by operations such as the mouth operation.

Furthermore, when, in a display using a tab, an event requiring an emergent processing occurs within a tab and even if the tab is hidden, the present invention makes it possible to display the event that has occurred within the hidden tab.

What is claimed is:

1. A displaying method in an information processing apparatus, comprising the steps of:

displaying, on a display apparatus, tasks or objects to be processed as a tree which is expandable and reducible and has a multi-hierarchy;

displaying, on the display apparatus, a state of a leaf of a node of said tree that is not displayed in said tree, said node is at a lowest hierarchy displayed in said tree;

monitoring to see if an emergent state event has occurred in a leaf;

when occurrence of an emergent state event is detected, changing a leaf corresponding to said occurring emergent state event into an emergent state and also changing a node that includes said leaf into a state in which a leaf in an emergent state is included; and determining whether a higher order node of said node has been expanded, and if not expanded, changing said higher order node into a state in which a leaf in an emergent state is included, and further determining whether an even higher order node of said higher order node is expanded, and if expanded, changing a display of said even higher order node of said higher order node into a state in which a leaf in an emergent state is included.

2. A displaying method in an information processing apparatus, comprising the steps of:

displaying, on a display apparatus, tasks or objects to be processed as a tree which is expandable and reducible and has a multi-hierarchy;

displaying, on the display apparatus, a state of a leaf of a node of said tree that is not displayed in said tree, said node is at a lowest hierarchy displayed in said tree;

if a display of a node which is instructed to be expanded is in a state of a node in which a leaf in an emergent state is included, expanding a lower order hierarchy of said node and changing the display of said node into a normal state and, of nodes in the expanded lower order hierarchy, changing a display of a node in a state in which a leaf in an emergent state is included into said state in which a leaf in an emergent state is included; and if a leaf in an emergent state is included in a node which is instructed to be reduced, reducing a lower order hierarchy of said node into a display of that state.

* * * * *